United States Patent
Zhang et al.

(10) Patent No.: US 11,539,284 B2
(45) Date of Patent: Dec. 27, 2022

(54) DC CONVERSION SYSTEM AND CONTROL METHOD THEREOF

(71) Applicant: Delta Electronics (Shanghai) CO., LTD, Shanghai (CN)

(72) Inventors: Yi Zhang, Shanghai (CN); Pian Zhou, Shanghai (CN); Hongwei Xiao, Shanghai (CN); Teng Liu, Shanghai (CN)

(73) Assignee: Delta Electronics (Shanghai) CO., LTD., Shanghai (CN)

( * ) Notice: Subject to any disclaimer, the term of this patent is extended or adjusted under 35 U.S.C. 154(b) by 0 days.

(21) Appl. No.: 17/333,172

(22) Filed: May 28, 2021

(65) Prior Publication Data

US 2021/0376732 A1     Dec. 2, 2021

(30) Foreign Application Priority Data

Jun. 2, 2020   (CN) .......................... 202010489095.3

(51) Int. Cl.
*H02M 3/158*     (2006.01)
*H02M 1/00*      (2006.01)

(52) U.S. Cl.
CPC ....... *H02M 1/0074* (2021.05); *H02M 3/1584* (2013.01)

(58) Field of Classification Search
CPC ...................... H02M 1/0074; H02M 3/335–42
See application file for complete search history.

(56) References Cited

U.S. PATENT DOCUMENTS

| | | | |
|---|---|---|---|
| 2014/0307481 A1 | 10/2014 | Wang et al. | |
| 2018/0050603 A1* | 2/2018 | Hand, III | H02J 7/0019 |
| 2020/0006970 A1 | 1/2020 | Chen et al. | |
| 2020/0127576 A1* | 4/2020 | Hayashi | H02M 7/217 |
| 2021/0273578 A1* | 9/2021 | Sigamani | H02M 1/083 |

FOREIGN PATENT DOCUMENTS

| | | |
|---|---|---|
| CN | 101345490 B | 1/2012 |
| CN | 104980015 B | 4/2018 |
| JP | 2008072856 A | 3/2008 |
| TW | 201714394 A | 4/2017 |
| WO | 2012140781 A1 | 10/2012 |

\* cited by examiner

*Primary Examiner* — Peter M Novak
(74) *Attorney, Agent, or Firm* — Qinghong Xu

(57) ABSTRACT

The present disclosure provides a DC conversion system and a control method thereof. The DC conversion system comprises: an upper power module group, a lower power module group, input terminals of the upper and lower power module group are connected in series, and output terminals of the upper and lower power module groups are connected in parallel; the controller configured to receive an input voltage of respective input terminal of each of the first and second power modules, a first output current of the output terminal of the upper power module group, a second output current of the output terminal of the lower power module group, and a total output signal of the output terminal of the DC conversion system, and generate a modulation signal according to them to control a power switch of the corresponding power module.

12 Claims, 16 Drawing Sheets

DC CONVERSION SYSTEM AND CONTROL METHOD THEREOF

TECHNICAL FIELD

The present disclosure relates to the technical field of power electronics, in particular to a direct current (DC) conversion system and a control method thereof.

BACKGROUND

With the development of industry and the increase of electric equipment, the reliability of power supplies and the requirements of voltage and current have gradually increased. Due to the limitations of voltage and current stresses of power switching devices, a single power supply cannot meet application occasions with high voltage and high power. A Direct Current/Direct Current (DC/DC) combined conversion system having a high-voltage side in series and a low-voltage side in parallel can be adopted to distribute the power equally to each DC/DC unit and reduce voltage stress and current stress of each DC/DC unit. Therefore, it is possible to select low-voltage power switching devices with better performance. In addition, each DC/DC unit of the DC/DC combined conversion system has the advantages of modularization, short development cycle, easy expansion and redundancy design.

In a DC/DC combined conversion system with a high-voltage side in series and a low-voltage side in parallel, in order to ensure stable operation of the converter, it is necessary to ensure a voltage equalization (voltage balancing) on the series side and a current equalization (current balancing) on the parallel side. Especially when parameters of the DC/DC converter have a great impact on the voltage deviation, the voltage imbalance or the current imbalance is more serious, which will affect the selection of power switches, thermal design and the like, and reduce conversion system performance and reliability.

In summary, the voltage equalization and current equalization of the combined DC/DC conversion system needs a solution urgently.

It should be noted that the information disclosed in the above background section is only used to enhance the understanding of the background of the present disclosure, and therefore may include information that does not constitute prior art known to those of ordinary skill in the art.

SUMMARY

According to a first aspect of the present disclosure, a DC conversion system is provided, the DC conversion system includes: an input terminal and an output terminal; an upper power module group comprising an input terminal, an output terminal, and at least two first power modules, the input terminals of the at least two first power modules being connected in series, and the output terminals of the at least two first power modules being connected in parallel; a lower power module group comprising an input terminal, an output terminal, and at least two second power modules, the input terminals of the at least two second power modules being connected in series, and the output terminals of the at least two second power modules being connected in parallel; the input terminal of the upper power module group and the input terminal of the lower power module group being connected in series, and the output terminal of the upper power module group and the output terminal of the lower power module group being connected in parallel; a controller coupled to the upper power module group and the lower power module group, and configured to: receive an input voltage of respective input terminal of each of the first power modules and the second power modules, a current of the output terminal of the upper power module group defining a first output current, a current of the output terminal of the lower power module group defining a second output current, and a total output signal of the output terminal of the DC conversion system, and generate a modulation signal according to the input voltage of respective input terminal of each of the first power modules and the second power modules, the first output current, the second output current, and the total output signal, so as to control a power switch of each of the first power modules and the second power modules.

According to a second aspect of the present disclosure, a DC conversion system is provided, the DC conversion system includes an input terminal and an output terminal; an upper power module group comprising an input terminal, an output terminal, and at least two first power modules, the input terminals of the at least two first power modules being connected in series, and the output terminals of the at least two first power modules being connected in parallel; a lower power module group comprising an input terminal, an output terminal, and at least two second power modules, the input terminals of the at least two second power modules being connected in series, and the output terminals of the at least two second power modules being connected in parallel; the input terminal of the upper power module group and the input terminal of the lower power module group being connected in series, and the output terminal of the upper power module group and the output terminal of the lower power module group being connected in parallel; a controller coupled to the upper power module group and the lower power module group, and the controller is configured to: receive an input voltage of respective input terminal of each of the first power modules and the second power modules; a current of the output terminal of the upper power module group defining a first output current, a current of the output terminal of the lower power module group defining a second output current, a current of the output terminal of the DC conversion system defining a total output current, receive at least two of the first output current, the second output current, and the total output current; and generate a modulation signal according to at least two of the first output current, the second output current, and the total output current, as well as the input voltage of each of the first power modules and the second power modules, so as to control a power switch of each of the first power modules and the second power modules.

According to a third aspect of the present disclosure, a control method for a DC conversion system is provided, the DC conversion system includes at least two first power modules, at least two second power modules, and a controller, and input terminals of the at least two first power modules being connected in series to form an upper power module group, input terminals of the at least two second power modules being connected in series to form a lower power module group, and output terminals of each of the first power modules and each of the second power modules being connected in parallel, the controller being coupled to each of the first power modules and the second power modules, and the control method includes: acquiring a respective input voltage of each of the first power modules and the second power modules; acquiring a first output current of the upper power module group, a second output current of the lower power module group, and a total output signal of the output terminal of the DC conversion system; generating a modulation signal according to the input voltage of each of the first power modules and the second power modules, the first output current, the second output current, and the total output signal; according to the modulation signal, controlling a power switch of each of the first power modules and the second power modules.

It should be understood that the above general description and the following detailed description are only exemplary and explanatory, and cannot limit the present disclosure.

BRIEF DESCRIPTION OF THE DRAWINGS

The drawings herein are incorporated into and constitute a part of the specification. The drawings show embodiments consistent with the present application, and are used to explain the principles of the application together with the specification. Obviously, the drawings in the following description are only some embodiments of the present disclosure. For those of ordinary skill in the art, without paying any creative work, other drawings can be obtained based on these drawings.

DETAILED DESCRIPTION

Figure 1:
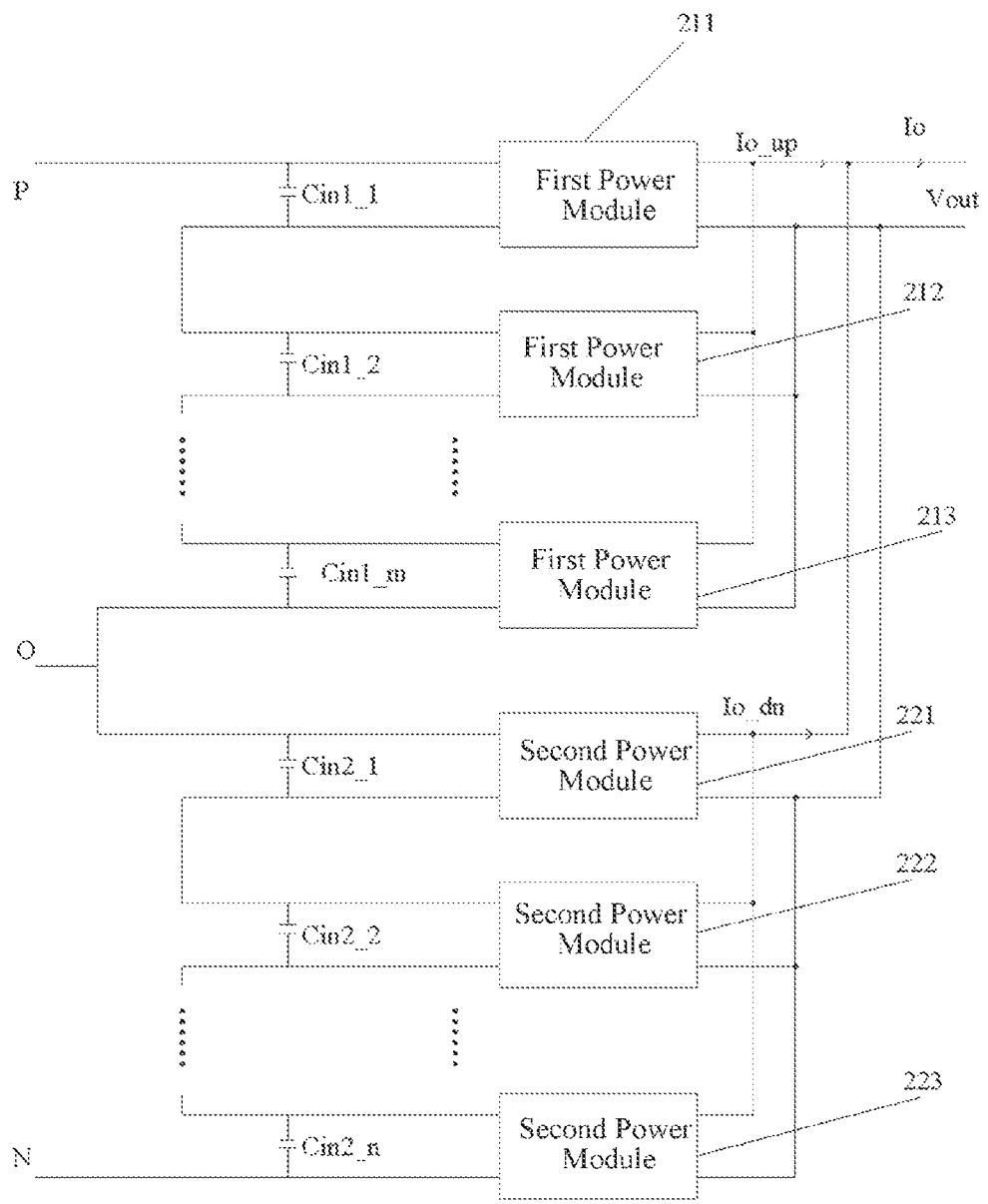
FIG. 1 schematically shows a circuit structure diagram of a DC conversion system according to an embodiment of the present disclosure.

Example embodiments will now be described more fully with reference to the drawings. However, the example embodiments can be implemented in various forms, and should not be construed as being limited to the examples set forth herein; on the contrary, providing these embodiments makes the disclosure more comprehensive and complete, and fully conveys the concept of the example embodiments to those skilled in the art.

In addition, the features, structures, or characteristics described above may be combined in any suitable manner in one or more embodiments. In the description below, numerous specific details are set forth to provide a thorough understanding of the embodiments of the present disclosure. However, those skilled in the art will appreciate that the technical solution of the present disclosure may be practiced without one or more of the specific details, or other methods, components, apparatus, steps and the like may be employed. In other instances, well-known methods, apparatus, implements or operations are not shown or described in detail to avoid obscuring various aspects of the present disclosure.

Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

Flowcharts shown in the drawings are only exemplary illustrations, and it is not necessary to include all contents and operations/steps, or to be executed in an order described. For example, some of the operations/steps can also be decomposed, and some of the operations/steps can be merged or partially merged, so an order of actual execution may change according to actual situations.

In the existing DC/DC combined conversion system in which a plurality of DC/DC units are connected in series on high-voltage side and connected in parallel on low-voltage side as well as a neutral point of high-voltage side is grounded, it is required to have a balance between voltages of the upper and lower parts of the neutral point. However, since parameters of DC/DC units in the upper and lower parts are different, such as the numbers of the DC/DC units in the upper and lower parts is inconsistent, or loads of the upper and lower parts are different, the voltage deviation will be large. In this case, measures for the voltage equalization need to be taken to control total output voltage, total output current or total output power of the system, or to control respective output power of the upper and lower buses.

For the DC/DC combined conversion system in which the plurality of DC/DC units are connected in series on high-voltage side and connected in parallel on low-voltage side as well as the neutral point of high-voltage side is grounded, when a equalization control is performed to voltages of upper and lower buses, it is necessary to make power of respective DC/DC units corresponding to the upper and lower buses be balanced separately, that is, voltage equalization on series side and current equalization on parallel side. At the same time, the system needs to be simple, easy to realize expansion and redundancy, in order to improve the reliability of the entire system.

In the existing voltage equalization scheme, hardware measures and software measures can be used. The hardware voltage equalization circuit is easy to implement when the number of DC/DC units is small, but if the system is applied to a medium-voltage or a high-voltage scenario, the increase of the number of DC/DC units will inevitably increase the system complexity. The existing software voltage equalization control is to perform unified voltage equalization control on DC/DC units of the entire bus, therefore it is only suitable for systems in which there is no neutral point or the neutral point has not connected to the ground, but it cannot guarantee voltages of the upper and lower buses of the system having neutral point grounded are balanced, and cannot guarantee voltages of respective DC/DC units are balanced yet.

It is obvious that, occurrence of voltage imbalance in a DC/DC combined conversion system with a high-voltage side in series and a low-voltage side in parallel will affect the selection of power switches, thermal design and so on, and reduce performance and reliability of the converter system. In order to ensure stable operation of the converter system, it is necessary to ensure voltage equalization on series side and current equalization on parallel side of all DC/DC units in the combined conversion system.

The embodiments of the present disclosure provide a DC conversion system and a control method thereof, so as to realize voltage equalization of the DC conversion system.

The embodiment of the present disclosure provides a DC conversion system. The DC conversion system includes an input terminal and an output terminal; an upper power module group; a lower power module group; and a controller. The upper power module group includes an input terminal, an output terminal, and at least two first power modules. As shown in FIG. 1, a first power module 211, a first power module 212 and a first power module 213 constitute an upper power module group, wherein the input terminals of the first power modules are connected in series with each other, and the output terminals of the first power modules are connected in parallel with each other. The lower power module group includes an input terminal, an output terminal and at least two second power modules. As shown in FIG. 1, a second power module 221, a second power module 222, and a second power module 223 constitute the lower power module group, wherein the input terminals of the second power modules are connected in series, and the output terminals of the second power modules are connected in parallel. Furthermore, after the input terminal of the upper power module group and the input terminal of the lower power module group are connected in series, the series-connected terminals are connected with the input terminals P and N of the DC conversion system respectively. After the output terminal of the upper power module group and the output terminal of the lower power module group are connected in parallel, the parallel-connected terminals are conneted with the output terminals of the DC conversion system. The controller (not shown in the FIG. 1) is coupled to the upper power module group and the lower power module group, and the controller receives an input voltage of respective input terminal of each of the first power modules and the second power modules, a first output current Io_up, a second output current Io_dn, and a total output signal, and generates a modulation signal according to the input voltage of respective input terminal of each of the first power modules and the second power modules, the first output current Io_up, the second output current Io_dn, and the total output signal of the output terminal of the DC conversion system, so as to control a power switch in each of the first power modules and the second power modules. Wherein the first output current Io_up is the current of the output terminal of the upper power module group, and the second output current Io_dn is the current of the output terminal of the lower power module group. Wherein the total output signal can be one, two or three of a total output voltage Vout, a total output current Io, and a total output power Po.

In the embodiment of the present disclosure, by sampling the input voltage of each of the power modules, the respective output current of the upper and lower power module groups, and the total output signal of the DC conversion system, and performing a closed-loop control according to the sampling results, a equalization control method can be performed to each of the power modules.

In the following, the power modules include first power modules and second power modules.

Figure 2:
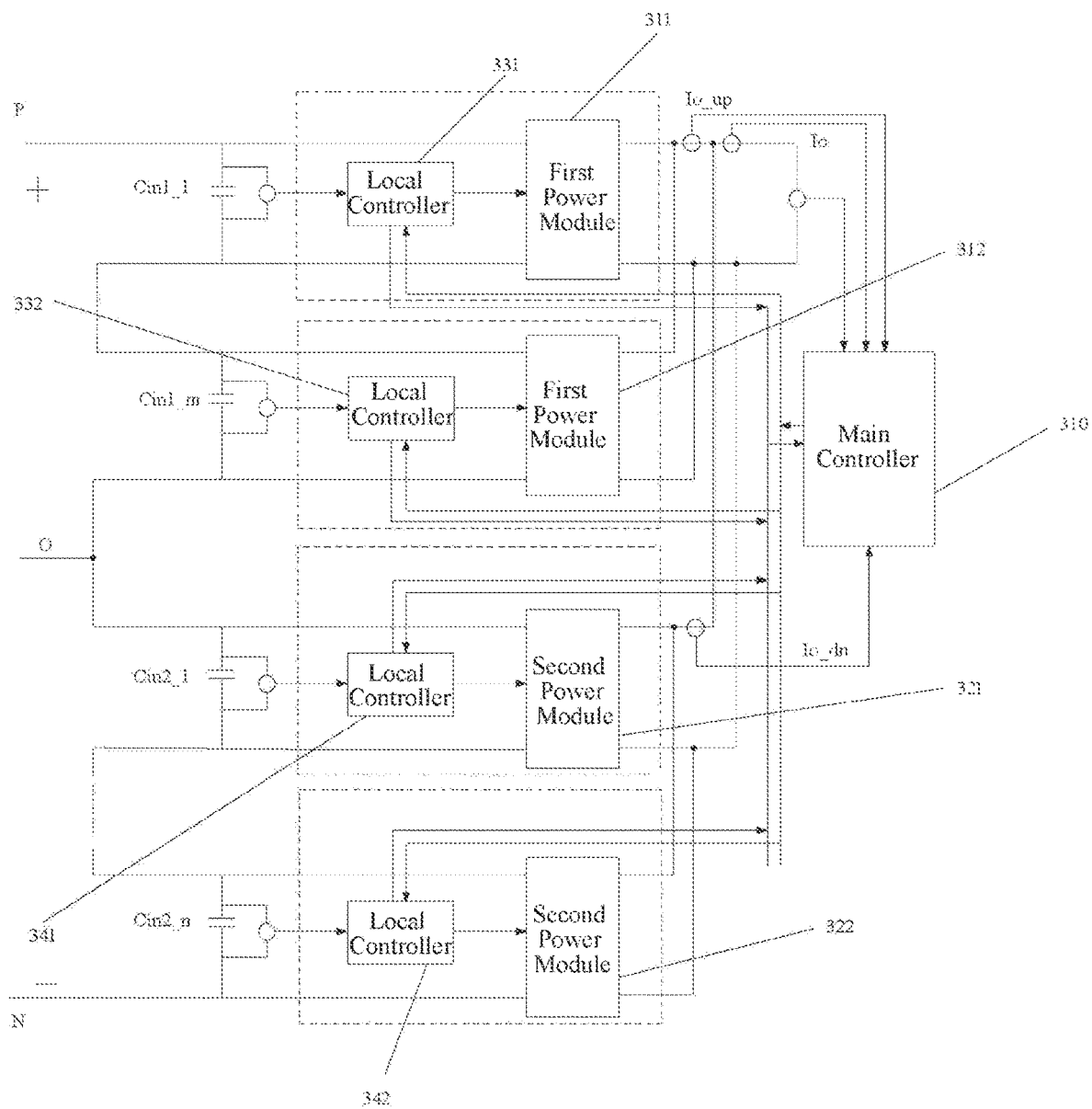
FIG. 2 schematically shows a control structure diagram of the DC conversion system according to an embodiment of the present disclosure.

As shown in FIG. 2, in the embodiment of the present disclosure, the input voltage of the input terminal of each of the first power modules is a corresponding one of voltages of the capacitors $Cin1\_1, Cin1\_2, \ldots Cin1\_m$, where each of the capacitors $Cin1\_1, Cin1\_2, \ldots Cin1\_m$ is connected in parallel with a corresponding first power module, and the input voltage of the input terminal of each of the second power modules is a corresponding one of voltages of the capacitors $Cin2\_1, Cin2\_2, \ldots Cin2\_n$, where each of the capacitors $Cin2\_1, Cin2\_2, \ldots Cin2\_n$ is connected in parallel with a corresponding second power module.

In the embodiment of the present disclosure, the series-connected node of the upper power module group and the lower power module group is grounded or connected with a voltage neutral point 0 of the input terminal of the DC conversion system. The neutral point of the power modules connected in series on high-voltage side is grounded with a low resistance, and then respective voltages-to-ground of upper and lower buses on high-voltage side of the DC conversion system are reduced to a half of a bus voltage, which can reduce a common-mode voltage-to-ground of each of the power modules. Since the technical solution of the embodiment of the present disclosure is to sample the input voltage of each of the power modules and the output currents of the upper and lower power module groups, and perform the closed-loop control according to the sampling results, so that the equalization control can be performed to each of the power modules accurately, which is not restricted by where the series-connected node of the upper power module group and the lower power module group is connected, such as connecting to the ground or connecting to the voltage neutral point of the input terminal of the DC conversion system, and can avoid the problems such as serious uneven power distribution of the upper and lower power module groups.

It is worth noting that, the embodiments of the present disclosure are all based on the high-voltage side being as input and the low-voltage side being as output, that is, based on input-series-output-parallel (ISOP), but the present disclosure is not limited to this. It is also applicable to a DC conversion system in which the high-voltage side is the output and the low-voltage side is the input, that is, input-parallel-output-series. The circuit structure shown in FIG. 2 is a DC conversion system in which the high-voltage side is connected in series and the low-voltage side is connected in parallel.

In the embodiment of the present disclosure, the numbers of the first power modules and the second power modules may be the same or different. As shown in FIG. 2, the upper power module group includes m first power modules, and the lower power module group includes n second power modules, and both m and n are natural numbers greater than or equal to 2. Where, m may be equal to n or not equal to n. When the numbers of the first power module and the second power module are different, since the present disclosure is to sample the input voltage of each of the power modules, and perform a closed-loop control according to the sampling results, therefore the equalization control can be performed to each of the power modules accurately, which is not restricted by the numbers of the first power modules and the second power modules.

As shown in FIG. 2, the output terminals of the m first power modules of the upper power module group are connected in parallel, and the parallel-connected terminals are connected to positive and negative terminals of the output terminal of the DC conversion system. Similarly, the output terminals of the n second power modules of the lower power module group are connected in parallel, and the parallel-connected terminals are connected to the positive and negative terminals of the output terminals of the DC conversion system. It should be noted that an output capacitor (not shown in the figure) can be a capacitor connected in parallel with the output terminal of the DC conversion system, or a plurality of capacitors connected in parallel with the output terminals of the m+n power modules in one to one correspondence, and the form thereof is not limited.

As shown in FIG. 2, the controller includes a main controller 310 and a plurality of local controllers. Each of the plurality of local controllers is coupled to a corresponding one of the first power modules and the second power modules. In some embodiments, the local controller 331 is coupled to the first power module 311, the local controller 332 is coupled to the first power module 312, the local controller 341 is coupled to the second power module 321, and the local controller 342 is coupled to the second power module 322. The main controller 310 is coupled to the plurality of local controllers, and the main controller 310 is used to: generate a first control signal c1 according to the first output current Io_up and the total output signal; generate a second control signal c2 according to the second output current Io_dn and the total output signal; wherein each of the plurality of local controllers coupled to the first power modules, such as the local controller 331 and the local controller 332, is used to: receive the first control signal c1; receive an input voltage of the corresponding first power module and generate a corresponding third control signal c3 according to the corresponding input voltage and a first input reference voltage; and generate a corresponding first modulation signal according to the first control signal c1 and the third control signal c3 to control the power switch in the coresponding first power module. Furthermore, each of the plurality of local controllers 341 and the local controllers 342 coupled to the second power modules is used to: receive the second control signal c2; receive an input voltage of the corresponding second power module and generate a corresponding fourth control signal c4 according to the corresponding input voltage and a second input reference voltage; and generate a corresponding second modulation signal according to the second control signal c2 and the fourth control signal c4 to control the power switch in the corresponding second power module.

It is worth noting that the local controller can be integrated with the corresponding power module, or can be set independently with the corresponding power module, and its specific form is not limited.

In this embodiment, the way of coupling between the main controller and the local controllers is not limited, and may be a direct connection, or a communication connection via optical fiber or wireless, etc. The present disclosure is not limited to this.

In addition, the DC conversion system may further include a plurality of input voltage sampling circuits, an output sampling circuit, and output current sampling circuits of the upper and lower power module groups. Each of the input voltage sampling circuits is used to collect or sample a capacitor voltage at the input terminal of a corresponding power module. The output sampling circuit is used to collect or sample one or more of the total output voltage, total output current or total output power of the output terminal of the DC conversion system. The output current sampling circuit of the upper power module group is used to sample the total current of the output terminal of the upper power module group, in which the parallel-connected output terminals of the m first power modules are defined as the output terminal of the upper power module group, namely the first output current Io_up, and the output current sampling circuit of the lower power module group is used to sample the total current of the output terminal of the lower power module group, in which the parallel-connected output terminals of the n second power modules are defined as the output terminal of the lower power module group, namely the second output current Io_dn.

Figure 3:
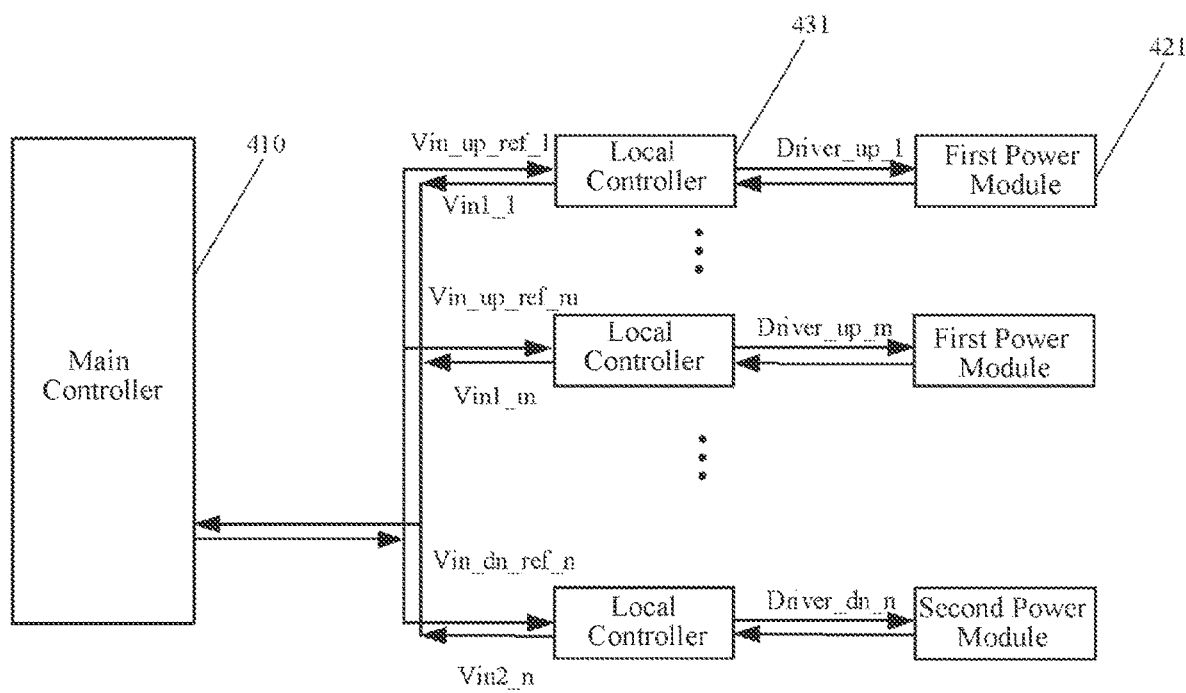
FIG. 3 schematically shows a schematic diagram of a connection relationship between main controller, local controllers and power modules according to an embodiment of the present disclosure.

As shown in FIG. 3, the local controllers corresponding to the m first power modules and the n second power modules upload input voltages Vin1_k and Vin2_k sampled respectively to the main controller 410. The main controller 410 calculates a first input reference voltage Vin_up_ref k and a second input reference voltage Vin_dn_ref k according to these input voltages and combining different application scenarios, and sends the first input reference voltage Vin_up_ref k and the second input reference voltage Vin_dn_ref k to a corresponding local controller. Herein and in the following, k is a natural number, representing a k-th first power module or a k-th second power module. In addition, each input reference voltage can be further calculated according to the voltage value of the input terminal of the DC conversion system. It is worth noting that the input reference voltages corresponding to the m+n power modules may be the same or different.

As shown in FIGS. 2 and 3, each of the local controllers generates a corresponding first modulation signal Driver_up_k or a corresponding second modulation signal Driver_dn_k, which are used to control a switch in the corresponding first power module and the second power module.

Figure 4:
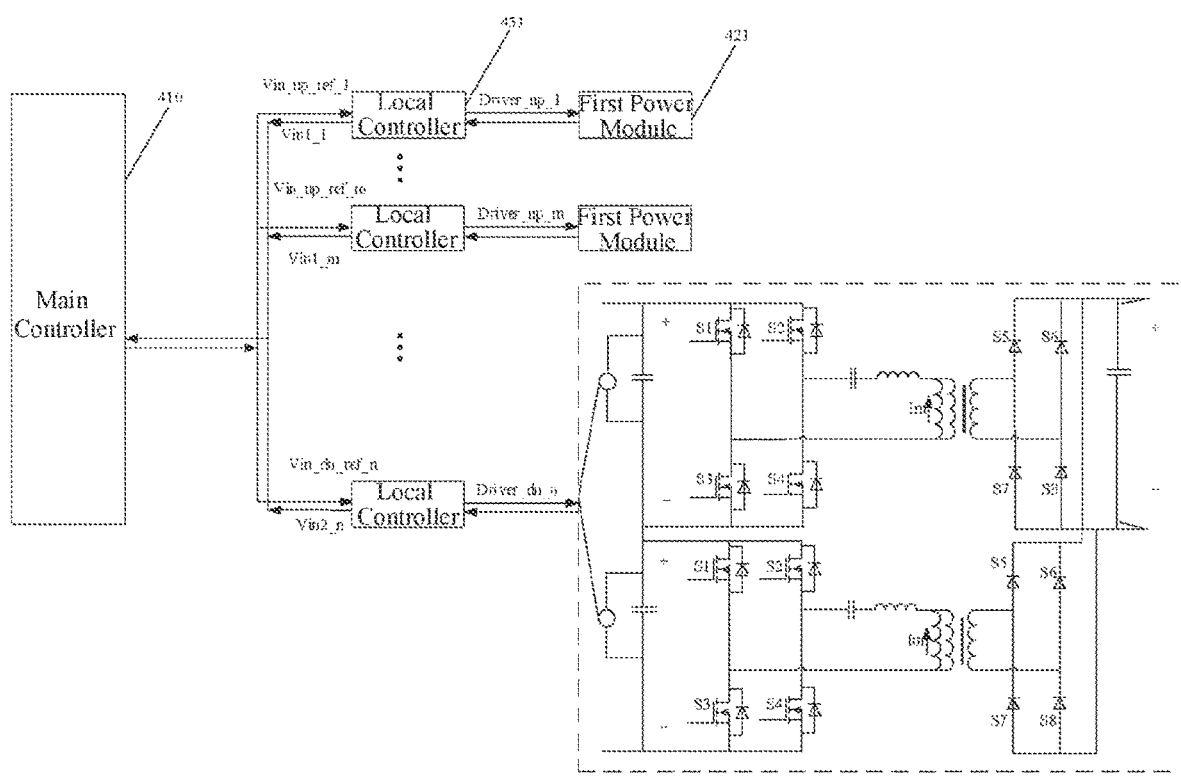
FIG. 4 schematically shows a structural diagram of a power module according to an embodiment of the present disclosure.

In this embodiment, the first power module and the second power module may be a series or parallel combination of one or more DC/DC converters. As shown in FIG. 4, the first power module or the second power module may be a combination structure of two or more LLC resonant converters. In this embodiment, the input terminals of the two LLC resonant converters are connected in series and the output terminals of the two LLC resonant converters are connected in parallel; in other embodiments, the input terminals of the two LLC resonant converters are connected in parallel and the output terminals of the two LLC resonant converters are connected in parallel, or has other connection. The present disclosure is not limited to this.

Figure 5A:
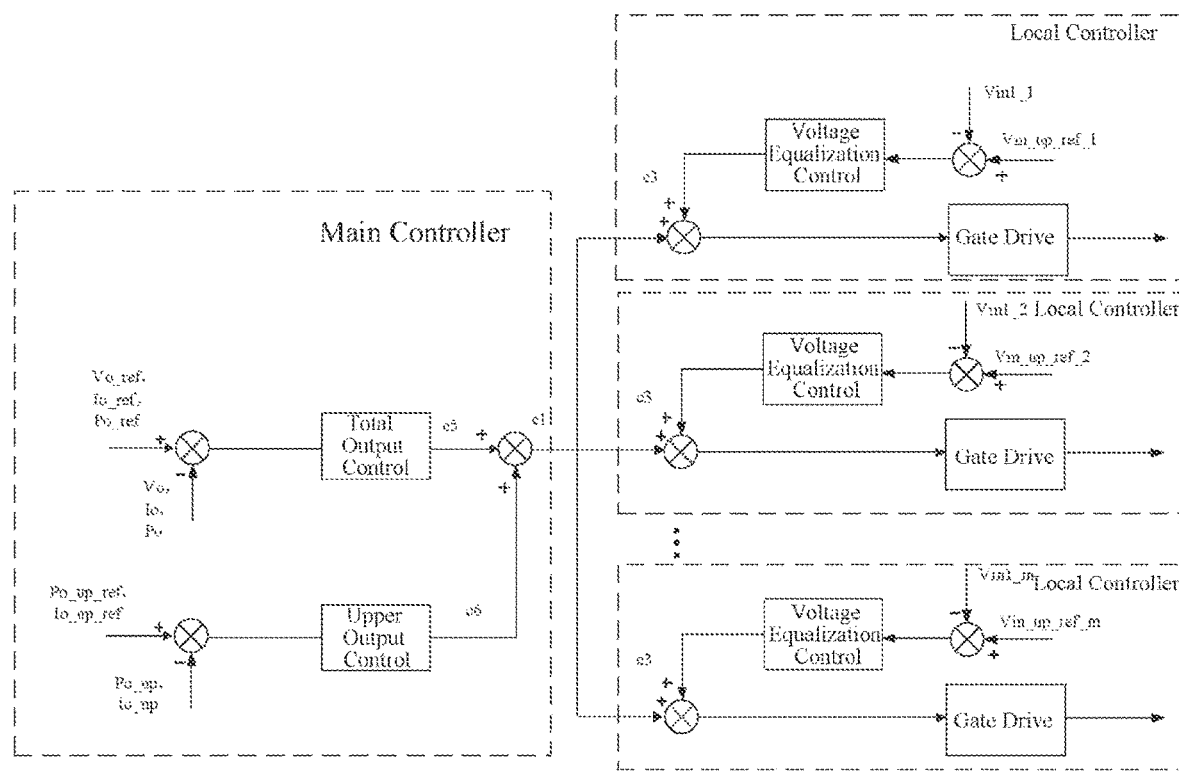
FIG. 5A schematically shows a schematic diagram of a signal processing process of an upper power module group according to an embodiment of the present disclosure.
Figure 5B:
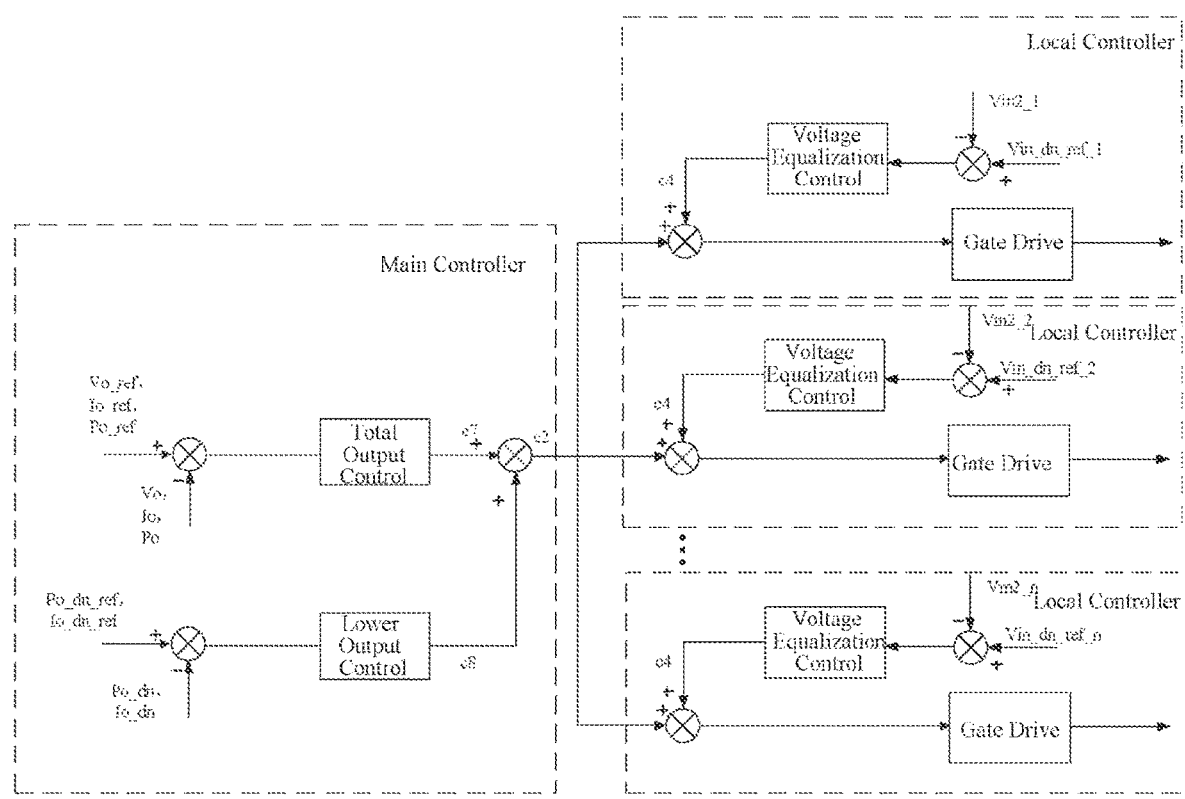
FIG. 5B schematically shows a schematic diagram of a signal processing process of a lower power module group according to an embodiment of the present disclosure.

Referring to FIG. 5A and FIG. 5B, as shown in FIG. 5A, for the control of the upper power module group, the main controller receives the total output signal of the DC conversion system. At the same time, the main controller can generate a total output reference signal, and then generate a fifth control signal c5 according to the total output signal and the total output reference signal. For example, a total output deviation signal is obtained by calculating the difference between the total output reference signal and the total output signal. The total output deviation signal is transmitted to a total output control unit to generate the fifth control signal c5. It is worth noting that the total output signal can be the total output voltage Vo, the total output current Io or the total output power Po, and the corresponding total output reference signals are the total output reference voltage Vo_ref, the total output reference current Io_ref or the total output reference power Po_ref, respectively. Where, the total output current Io can be calculated from the first output current Io_up and the second output current Io_dn, or directly obtained through a current sampling circuit. Similarly, the total output power Po can be calculated from the total output voltage Vo and the total output current Io, or directly obtained through a power sampling circuit. The present disclosure is not limited to this.

In this embodiment, the main controller is also used to receive the first output current Io_up. At the same time, the main controller can generate a first output reference current Io_up_ref, and then generate a sixth control signal c6 according to the first output current Io_up and the first output reference current Io_up_ref. For example, a first output current deviation is obtained by calculating the difference between the first output reference current Io_up_ref and the first output current Io_up, and the first output current deviation is transmitted to an upper output control unit to generate the sixth control signal c6. It is worth noting that, the first output current Io_up and the first output reference current Io_up_ref can also be replaced with the first output power Po_up and the first output reference power Po_up_ref, wherein the first output power Po_up can be obtained by the calculation of the first output current Io_up and the total output voltage Vo, or it can be obtained directly by a power sampling circuit.

The main controller further generates the first control signal c1 according to the fifth control signal c5 and the sixth control signal c6, and respectively sends the first control signal c1 to a local controller corresponding to each first power module.

Each of the local controllers is used to receive an input voltage Vin1_k of a corresponding first power module, and obtain a third control signal c3 according to the input voltage Vin1_k and a corresponding first input reference voltage Vin_up_ref k. For example, the difference between the input voltage Vin1_k and the first input reference voltage Vin_up_ref k is input to a corresponding voltage equalization control unit, and the voltage equalization control unit outputs the third control signal c3. Finally, the local controller generates a first modulation signal according to the third control signal c3 and the first control signal c1, and the first modulation signal is used to control the power switch in the corresponding first power module, that is, the first modulation signal can be converted to a driving signal so as to drive the power switch of the corresponding first power module on or off.

Similarly, as shown in FIG. 5B, the control method of the lower power module group is basically consistent with the control method of the upper power module group. The main controller receives the total output signal of the DC conversion system. At the same time, the main controller can generate a total output reference signal, and then generate a seventh control signal c7 according to the total output signal and the total output reference signal. It is worth noting that the total output signal can be the total output voltage Vo, the total output current Io or the total output power Po, and the corresponding total output reference signals are the total output reference voltage Vo_ref, the total output reference current Io_ref or the total output reference power Po_ref, respectively. Among them, the total output current Io can be calculated from the first output current Io_up and the second output current Io_dn, or directly obtained through a current sampling circuit. Similarly, the total output power Po can be calculated from the total output voltage Vo and the total output current Io, or directly obtained through a power sampling circuit. The present disclosure is not limited to this.

It is worth noting that the fifth control signal c5 and the seventh control signal c7 can be the same signal or different signals. Where, when the upper power module group and the lower power module group both use a same total output control unit, the fifth control signal c5 and the seventh control unit c7 are the same signal; and when the upper power module group and the lower power module group are controlled according to different total output signals, that is, different total output control units are used, the fifth control signal c5 and the seventh control signal c7 are different signals.

The main controller is also used to receive the second output current Io_dn. At the same time, the main controller can generate a second output reference current Io_dn_ref, and then generate an eighth control signal c8 according to the second output current Io_dn and the second output reference current Io_dn_ref. It is worth noting that the second output current Io_dn and the second output reference current Io_dn_ref can also be replaced with the second output power Po_dn and the second output reference power Po_dn_ref, wherein the second output power Po_dn can be obtained by the calculation of the second output current Io_dn and the total output voltage Vo, or it can be obtained directly by a power sampling circuit.

The main controller further generates the second control signal c2 according to the seventh control signal c7 and the eighth control signal c8, and respectively sends the second control signal c2 to a local controller corresponding to each second power module. Each of the local controllers is configured to respectively receive the input voltage Vin2_k of the corresponding second power module, and obtain the fourth control signal c4 according to the input voltage Vin2_k and a corresponding second input reference voltage Vin_dn_ref_k. Finally, the local controller generates a second modulation signal according to the fourth control signal c4 and the second control signal c2, and the second modulation signal is used to control the power switch in the corresponding second power module, that is, the first modulation signal can be converted to a driving signal so as to drive the power switch of the corresponding second power module on or off.

In the embodiment, the above-mentioned first to eighth control signals (i.e., c1-c8) may be frequency signals, duty cycle signals or other forms of signals, and the present disclosure is not limited.

In the embodiment, the first output reference power Po_up_ref, the second output reference power Po_dn_ref, the first output reference current Io_up_ref, and the second output reference current Io_dn_ref can all be determined according to output capabilities or requirements of the upper and lower power module groups, and each can be ½ of the total output power or the total output current of the DC conversion system, or can also be calculated based on the output power or output current that each of the actual power modules needs to bear.

Figure 6:
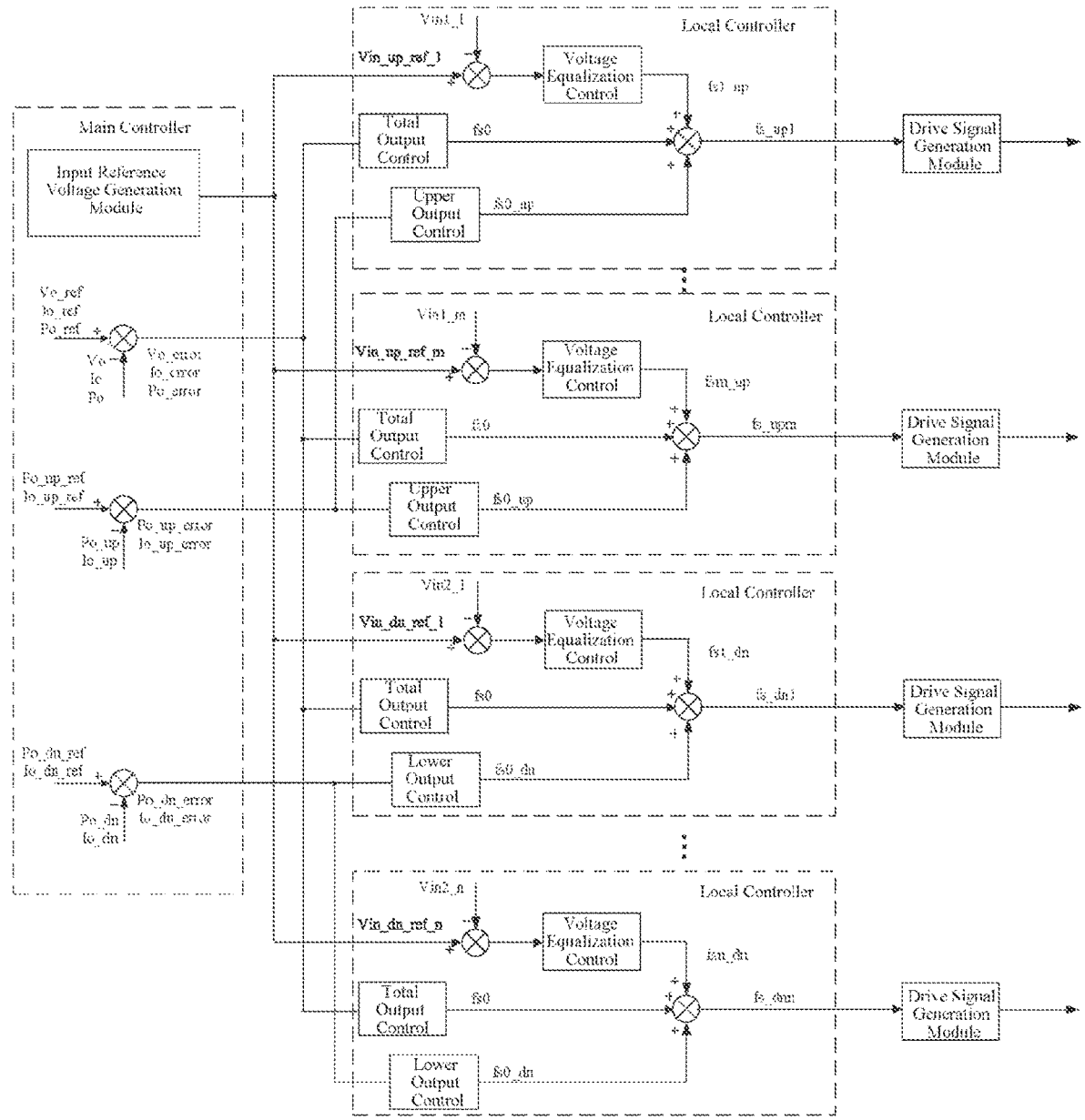
FIG. 6 schematically shows a schematic diagram of a signal processing process of a DC conversion system according to another embodiment of the present disclosure.

In the embodiment of the present disclosure, a signal processing process completed respectively by the main controller and the local controllers includes various kinds of ways for distribution. In the embodiment shown in FIG. 5A and FIG. 5B, the total output control, the upper output control and the lower output control are all completed by the main controller, and the main controller sends the generated first control signal c1 and second control signal c2 to the corresponding local controller. Furthermore, in other embodiments, at least one of the total output control, the upper output control and the lower output control can also be completed by the local controller. For example, as shown in FIG. 6, the main controller can calculate a total output deviation signal (such as Vo_error, Io_error, Po_error) based on the total output signal (such as Vo, Io, Po) and the total output reference signal (such as Vo_ref, Io_ref, Po_ref), and send the total output deviation signal to each of the local controllers; at the same time, the main controller can calculate a first output current deviation Io_up_error (or a first output power deviation Po_up_error) according to the first output current Io_up (or the first output power Po_up) and the first output reference current Io_up_ref (or the first output reference power Po_up_ref), and calculate a second output current deviation Io_dn_error (or a second output power deviation Po_dn_error) accroding to the second output current Io_dn (or the second output power Po_dn) and the second output reference current Io_dn_ref (or the second output reference power Po_dn_ref), and then send the first output current deviation Io_up_error and the second output current deviation Io_dn_error to the local controllers corresponding to the first power modules and the local controllers corresponding to the second power modules, respectively. Finally, the corresponding local controller completes the total output control, the upper output control or the lower output control, and the voltage equalization control, and generates the corresponding modulation signal, so as to control the power switch in the first power modules or the second power modules.

Figure 7:
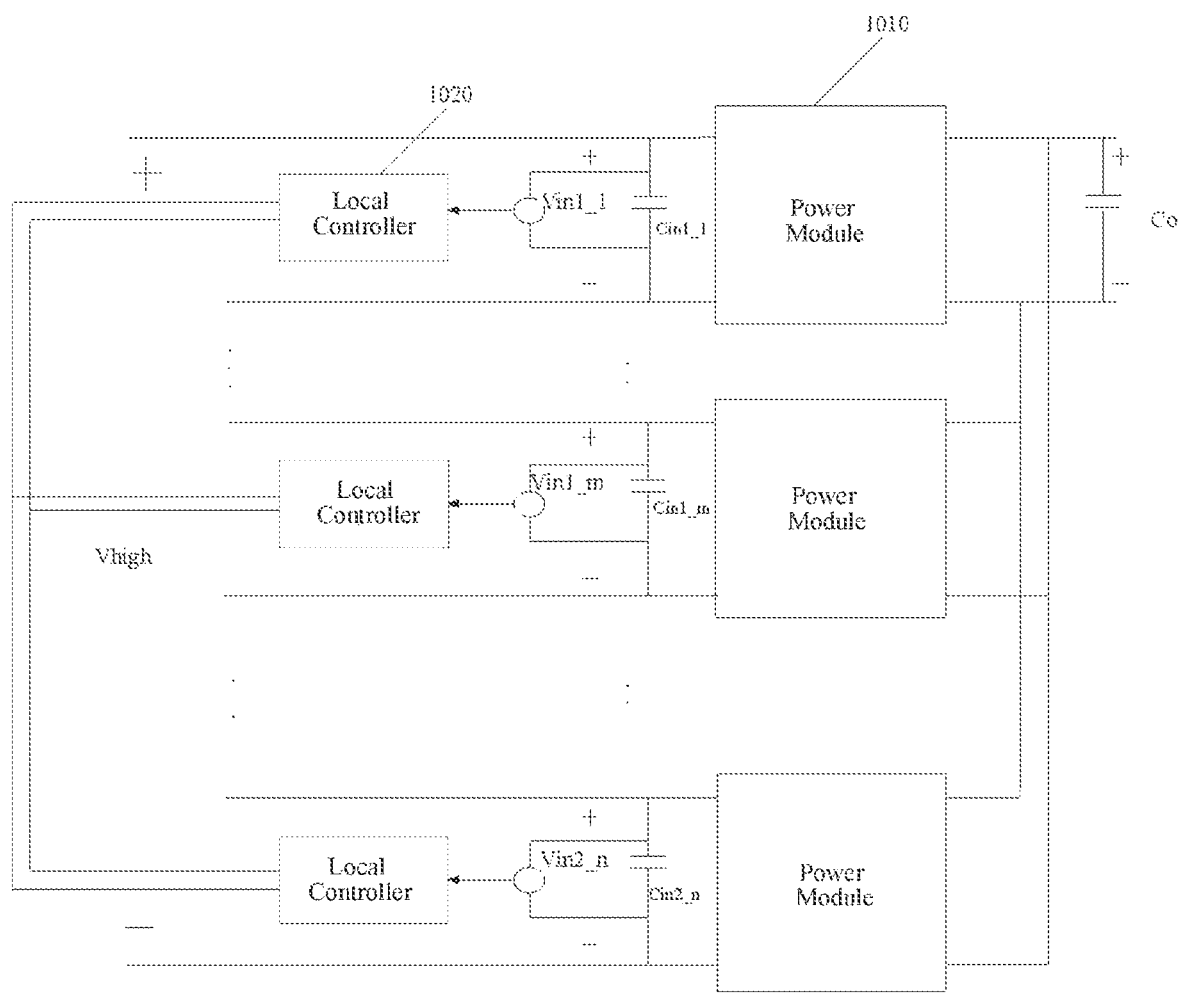
FIG. 7 schematically shows a control structure diagram of a DC conversion system according to another embodiment of the present disclosure.

Further, in some other embodiments, the main controller can also be omitted, and the above-mentioned control functions can be completed only by the local controllers. In the DC conversion system as shown in FIG. 7, m+n local controllers 1020 corresponding to m+n power modules 1010 in a way of one-to-one correspondence are connected through a competitive master-slave communication bus. This scheme can reduce the number of controllers and improve system reliability. When the DC conversion system is working, it is necessary to select a local controller from the m+n local controllers as a master to complete the function of the main controller, and the rest other local controllers can be used as slaves. The master can be switched freely according to the actual situation, therefore the scheme has good redundancy.

Figure 8:
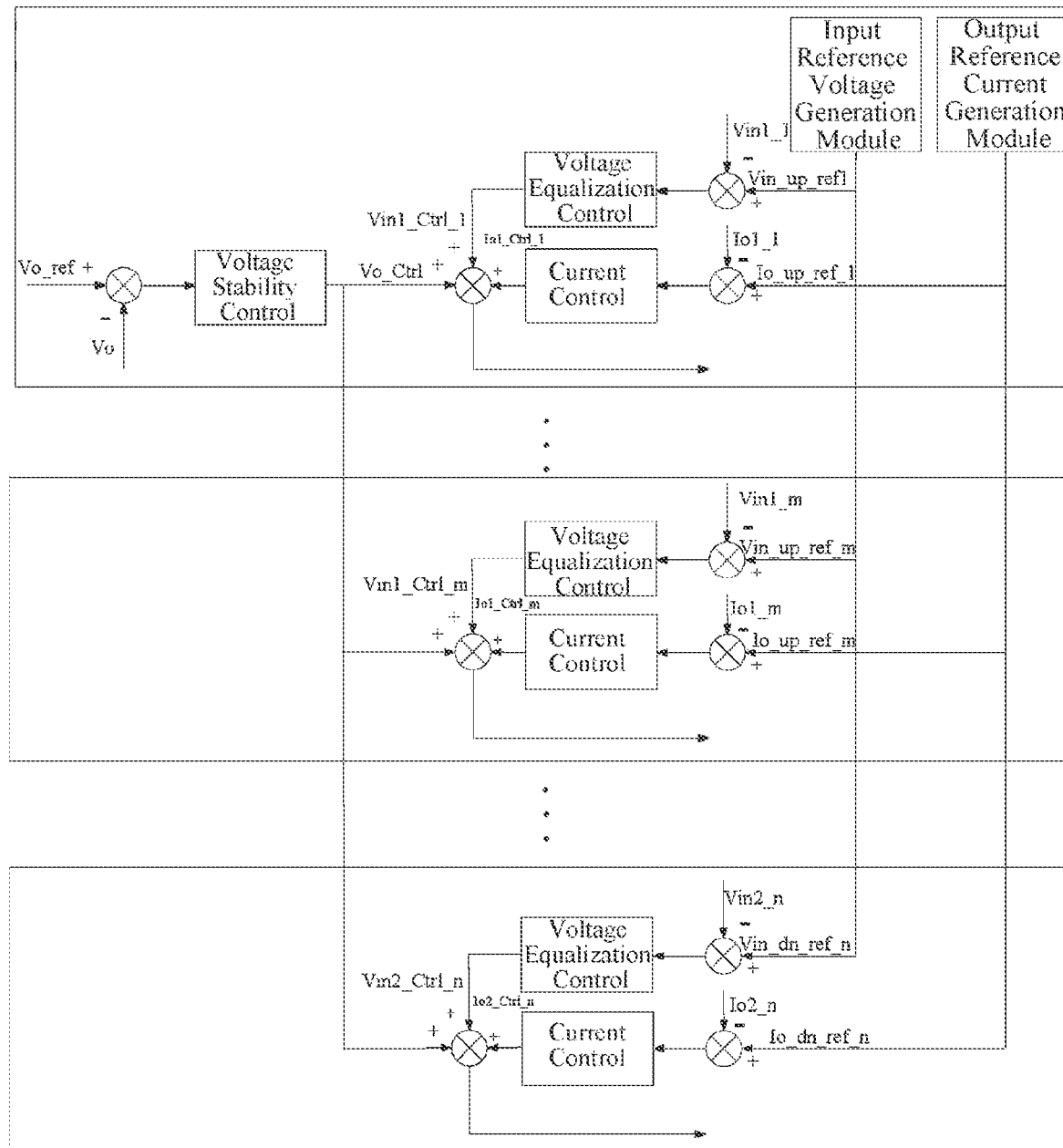
FIG. 8 schematically shows a schematic diagram of a signal processing process of a DC conversion system according to another embodiment of the present disclosure.
Figure 9:
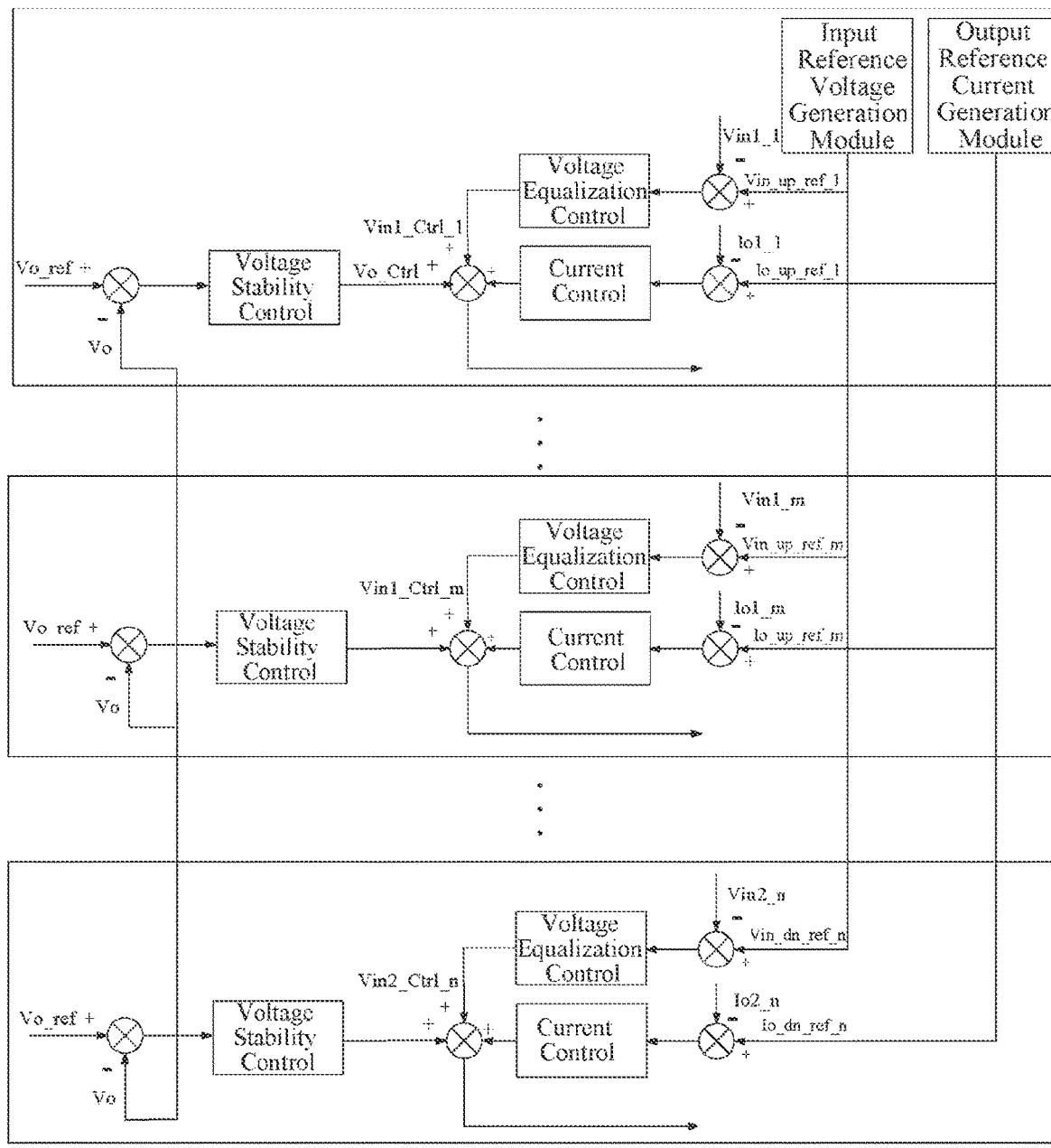
FIG. 9 schematically shows a schematic diagram of a signal processing process of a DC conversion system according to another embodiment of the present disclosure.
Figure 10:
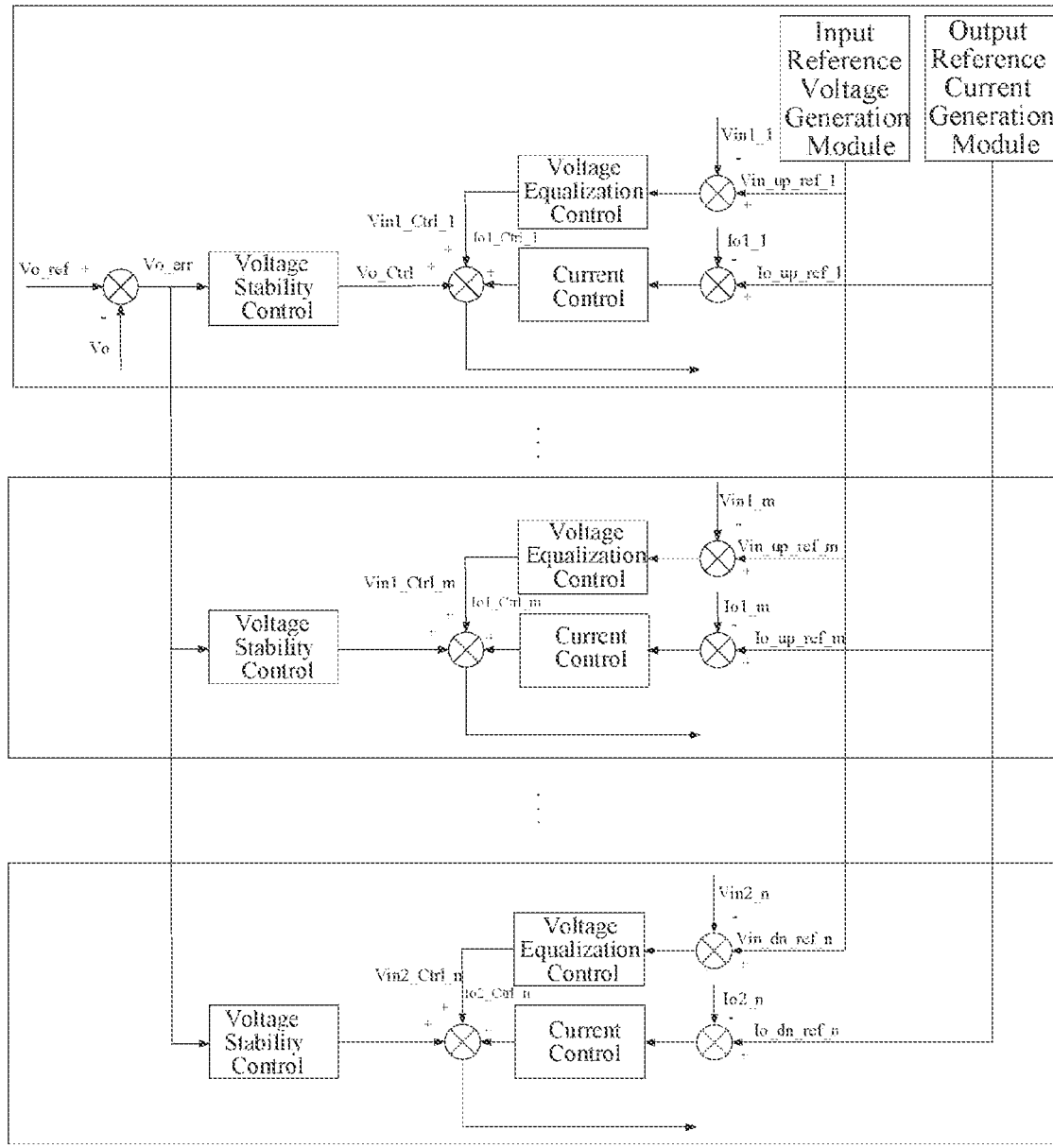
FIG. 10 schematically shows a schematic diagram of a signal processing process of a DC conversion system according to another embodiment of the present disclosure.

FIGS. 8 to 10 are specific examples of the competitive master-slave control scheme shown in FIG. 7. As shown in FIG. 8, it is assumed that a local controller in the upper power module group competes to become a master, and the master receives a total output voltage Vo, and obtain a total output voltage control signal Vo_Ctrl according to the total output voltage Vo and a total output reference voltage Vo_ref and then send the total output voltage control signal Vo_Ctrl to each of slaves (i.e., other local controllers). The master further includes an input reference voltage generation module (Vin_ref Generator) and an output reference current generation module (Io_ref Generator). The input reference voltage generation module generates a first input reference voltage Vin_up_ref_k and a second input reference voltage Vin_dn_ref_k, based on the obtained input voltages and module operating status of respective power modules, and sends the first input reference voltage Vin_up_ref_k and the second input reference voltage Vin_dn_ref_k to the respective slaves corresponding to the upper and lower power module groups. Each of slaves obtains a voltage equalization control signal Vin1_Ctrl_k or Vin2_Ctrl_k according to the input reference voltage Vin_up_ref_k or Vin_dn_ref_k and the respective actual input voltage Vin1_k or Vin2_k.

The output reference current generation module generates a first output reference current Io_up_ref_k corresponding to the first power modules and a second output reference current Io_dn_ref_k corresponding to the second power modules, based on the obtained output currents and module operating status of the upper and lower power module groups, and sends the first output reference current Io_up_ref_k and the second output reference current Io_dn_ref_k to respective slaves corresponding to the upper and lower power module groups. Each of the slaves obtains the output current control signal Io1_Ctrl_k or Io2_Ctrl_k according to the first output reference current Io_up_ref_k or the second output reference current Io_dn_ref k, the actual output current Io1_k or Io2_k, and finally generates a first modulation signal (or a second modulation signal) according to the obtained voltage equalization control signal Vin1_Ctrl_k (or Vin2_Ctrl_k), the output current control signal Io1_Ctrl_k (or Io2_Ctrl_k) and the total output voltage control signal Vo_Ctrl, so as to control the power switch in the corresponding first power module (or the second power module).

In the competitive master-slave solution, the master is not limited to its location, it may be a local controller corresponding to a certain first power module of the upper power module group, or a local controller corresponding to a certain second power module of the lower power module group. Once the master has failed, the competitive master-slave mechanism is activated, and another local controller takes over the positon of the master and becomes a new master. In addition, the input reference voltage and the output reference current may be the same or not exactly the same.

As shown in FIG. 9, the master can send the total output voltage Vo to the respective slaves. As shown in FIG. 10, the master can also send the total output voltage deviation Vo_error calculated according to the total output voltage and the total output reference voltage to the respective slaves. Each of the slaves independently performs the total output voltage control to obtain the total output voltage control signal Vo_Ctrl, and then combines the voltage equalization control signal Vin1_Ctrl_k (or Vin2_Ctrl_k) and the output current control signal Io1_Ctrl_k (or Io2_Ctrl_k) obtained by the respective local controllers to calculate the first modulation signal (or the second modulation signal).

Figure 11:
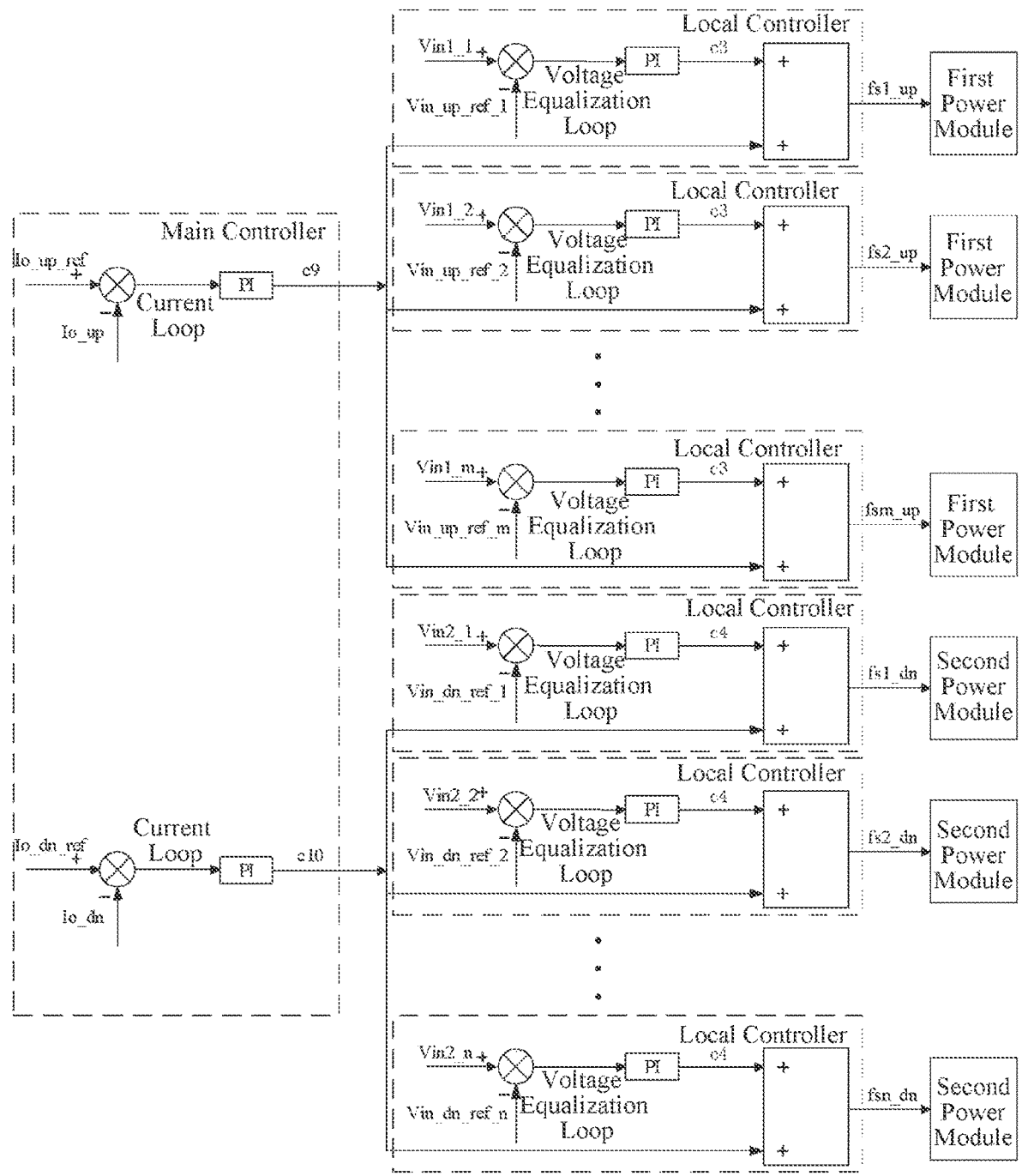
FIG. 11 schematically shows a schematic diagram of a signal processing process of a DC conversion system according to yet another embodiment of the present disclosure.

In the DC conversion system provided by another embodiment of the present disclosure, the circuit structure is similar to that of the DC conversion system in the embodiment shown in FIG. 1, except that, in the circuit structure in the embodiment of the present disclosure as shown in FIG. 11, the controller is configured to: receive the input voltage of respective input terminal of each of the first power modules and the second power modules; receive at least two of the first output current, the second output current, and the total output current; generate a modulation signal according to at least two of the first output current, the second output current, and the total output current, as well as the corresponding input voltage, the modulation signal can be used to control the power switch in each of the first power modules and the second power modules.

In the embodiment of the present disclosure, a series-connected point of the input terminal of the upper power module group and the input terminal of the lower power module group is grounded or connected to the voltage neutral point of the input terminal of the DC conversion system. The number of the first power modules and the number of the second power modules may be the same or different.

In the embodiment of the present disclosure, the main controller may adopt different control strategies according to different sampling signals. For example, as shown in FIG. 11, the processes of generating a ninth control signal and a tenth control signal are different.

In the embodiment shown in FIG. 11, the controller receives the first output current $Io\_up$, the second output current $Io\_dn$, and the input voltage $Vin1\_k$ or $Vin2\_k$ of each power module and generates a corresponding modulation signal according to the first output current $Io\_up$, the second output current $Io\_dn$, and the input voltage $Vin1\_k$ or $Vin2\_k$. For example, the controller includes a main controller and a plurality of local controllers. The main controller is coupled to the plurality of local controllers. The main controller is configured to: generate the ninth control signal $c9$ according to the first output current $Io\_up$ and a first output reference current $Io\_up\_ref$; generate the tenth control signal $c10$ according to the second output current $Io\_dn$ and a second output reference current $Io\_dn\_ref$. Each of the plurality of local controllers is coupled to a corresponding one of the first power modules and the second power modules, wherein each of the plurality of local controllers coupled to the first power modules can be configured to: receive the ninth control signal $c9$; receive the corresponding input voltage $Vin1\_k$ and generate a corresponding control signal $c3$ based on the input voltage $Vin1\_k$ and a first input reference voltage $Vin\_up\_ref\_k$; and generate a corresponding first modulation signal based on the ninth control signal $c9$ and the third control signal $c3$, so as to control the power switch in the corresponding first power module. Each of the plurality of local controllers coupled to the second power module is configured to: receive the tenth control signal $c10$; receive the corresponding input voltage $Vin2\_k$ and generate a corresponding fourth control signal $c4$ based on the input voltage $Vin2\_k$ and a second input reference voltage $Vin\_dn\_ref\_k$, and generate a corresponding second modulation signal based on the tenth control signal $c10$ and the fourth control signal $c4$, so as to control the power switch in the corresponding second power module.

It is worth noting that in other embodiments, the main controller may also generate the ninth control signal $c9$ according to the first output current $Io\_up$ and the first output reference current $Io\_up\_ref$, and generate the tenth control signal $c10$ according to the total output current $Io$ and the total output reference current $Io\_ref$. The main controller can also generate the ninth control signal $c9$ according to the total output current $Io$ and the total output reference current $Io\_ref$, and generate the tenth control signal $c10$ according to the second output current $Io\_dn$ and the second output reference current $Io\_dn\_ref$. Furthermore, the ninth control signal $c9$ is sent to respective local controllers corresponding to the first power modules; and the tenth control signal $c10$ is sent to respective local controllers corresponding to the second power modules.

In the embodiment of the present disclosure, the process of generating the ninth control signal $c9$ and the tenth control signal $c10$ can also be completed in respective local controller, and the main controller is only used to generate respective reference signal (i.e., the first output reference current, the second output reference current, the total output reference current, the first input reference voltage, the second input reference voltage, etc.), and then send the reference signal to the respective local controller of each of the power modules. Alternatively, the main controller is only used to calculate the first output current deviation, the second output current deviation or the total output current deviation, etc., and then send the first output current deviation, the second output current deviation or the total output current deviation to the corresponding local controller. In short, the functions performed respectively by the main controller and the local controller can be arbitrarily allocated, and the present disclosure is not limited to this.

Moreover, in other embodiments, the main controller can be eliminated, and the local controllers in the upper and lower power module groups respectively determine one of its local controllers as a corresponding master through the competitive master-slave mechanism, and the rest other local controllers are determined as slaves. The ninth control signal $c9$ and the tenth control signal $c10$ are generated by the corresponding master respectively, and then the ninth control signal $c9$ or the tenth control signal $c10$ is sent to the slaves in the corresponding power module group by the master inside the same power module group, and then is used to generate a corresponding first modulation signal and second modulation signal.

In the embodiment of the present disclosure, the second control strategy is to generate a modulation signal, according to at least two of the first output current, the second output current and the total output current, as well as the total output voltage and the respective input voltage of each of the power modules. For example, taking that the sampled currents are the first output current $Io\_up$ and the second output current $Io\_dn$ as an example, the controller includes a main controller and a plurality of local controllers, and the main controller is coupled to the plurality of local controllers. The main controller is configured to: calculate a first output power $Po\_up$ according to the first output current $Io\_up$ and the total output voltage $Vo$, and generate a ninth control signal $c9$ according to the first output power $Po\_up$ and a first output reference power $Po\_up\_ref$. At the same time, the main controller calculates a second output power $Po\_dn$ according to the second output current $Io\_dn$ and the total output voltage $Vo$, and generate a tenth control signal $c10$ according to the second output power $Po\_dn$ and a second output reference power $Po\_dn\_ref$. The plurality of local controllers are each coupled to a corresponding one of the first power modules and the second power modules, wherein the plurality of local controllers coupled to the first power modules are each used to: receive the ninth control signal $c9$; receive the corresponding input voltage $Vin1\_k$ and generate a corresponding third control signal $c3$ according to the corresponding input voltage $Vin1\_k$ and the first input reference voltage $Vin\_up\_ref\_k$; and generate a corresponding first modulation signal according to the ninth control signal $c9$ and the third control signal $c3$, so as to control the power switch in the corresponding first power module. Similarly, each of the plurality of local controllers coupled to the second power modules is used to: receive the tenth control signal c10; receive the corresponding input voltage Vin2_k and generate a corresponding fourth control signal c4 according to the corresponding input voltage Vin2_k and the second input reference voltage Vin_dn_ref_k; and generate a corresponding second modulation signal according to the tenth control signal c10 and the fourth control signal c4, so as to control the power switch in the corresponding second power module.

Figure 12:
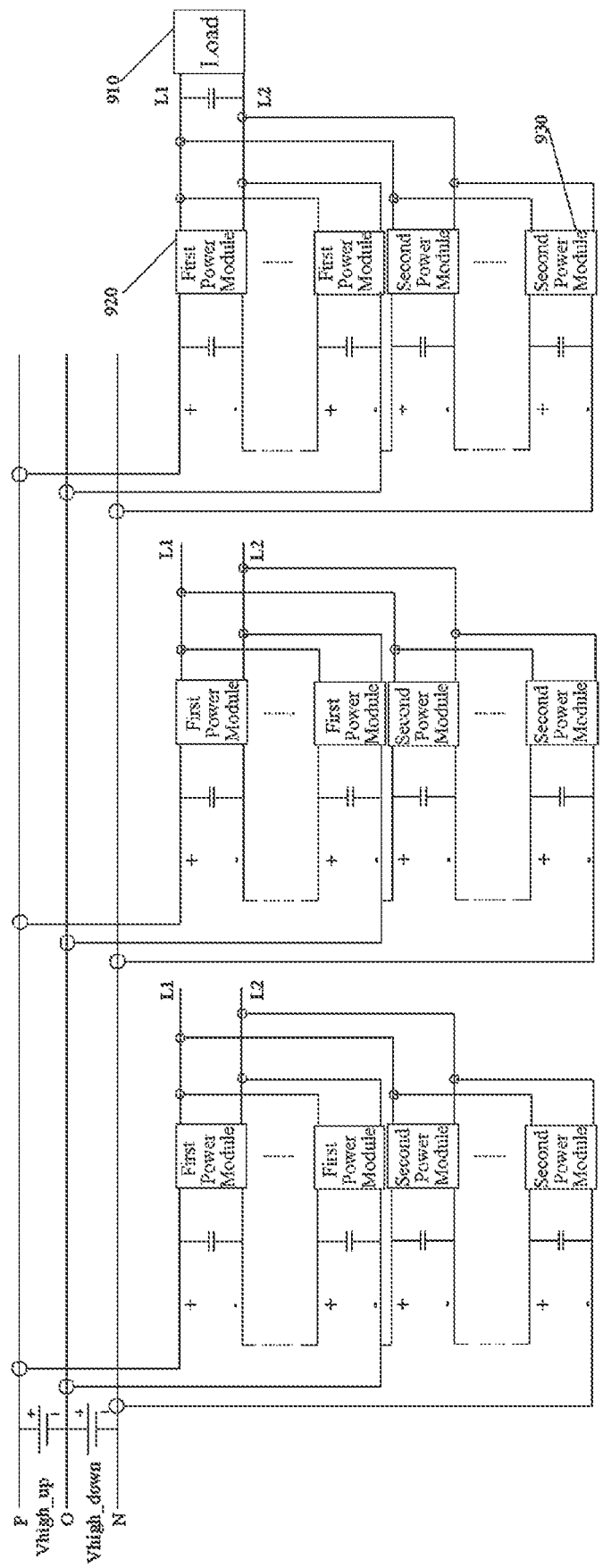
FIG. 12 schematically shows a schematic diagram of a parallel connection of the DC conversion system according to an embodiment of the present disclosure.

As shown in FIG. 12, when the output terminals of three ISOP DC conversion system (i.e., each of them is a DC conversion system with Input-Series-Output-Parallel) are connected in parallel and share one load 910 together, if one second power module 930 corresponding to one of the three ISOP DC conversion system has failed and all of second power modules in that ISOP DC conversion system must be removed, there is no need to remove first power modules 920 in the upper power module group in that DC conversion system, while within the power range and the current range that the power modules can withstand, the power or current distribution of the power modules in rest other DC conversion systems is adjusted again, in order to ensure that although the output power or output current of each power module in the upper and lower power module groups is not consistent, the voltage at the input terminal is still balanced.

Figure 13:
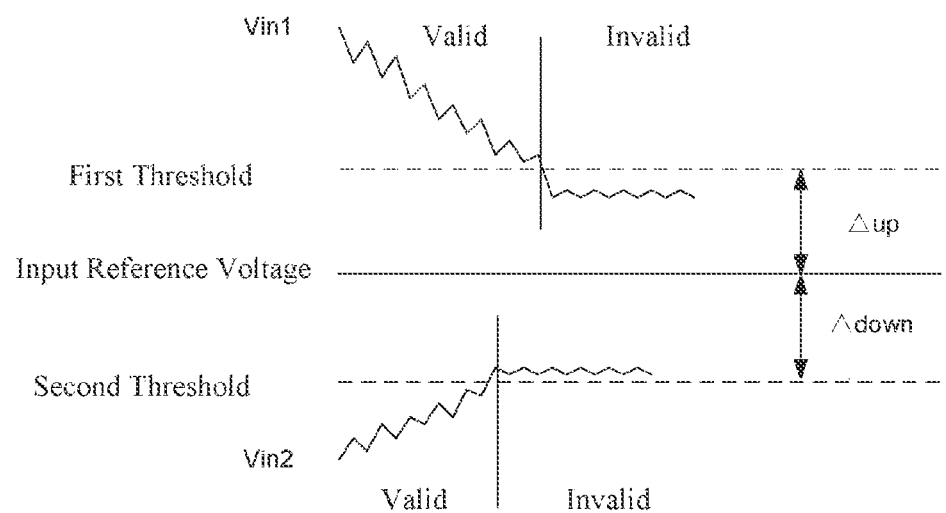
FIG. 13 schematically shows a schematic diagram of a voltage equalization control effect of an embodiment of the present disclosure.

As shown in FIG. 13, in this embodiment, the input voltage of the first power module is Vin1, the input voltage of the second power module is Vin2, and the corresponding input reference voltages are all Vin_ref. In the voltage equalization control, a voltage equalization threshold (that is, a first threshold and a second threshold) is added as needed. When Vin_ref-Vin1 is greater than the first threshold or less than the second threshold, a corresponding voltage equalization control unit works; conversely, when Vin_ref-Vin1 is between the first threshold and the second threshold, the voltage equalization control unit does not work. In the same way, the method for adding the voltage equalization threshold of the input voltage Vin2 of the second power module is the same. Wherein, the first threshold is greater than or equal to the second threshold.

Figure 14:
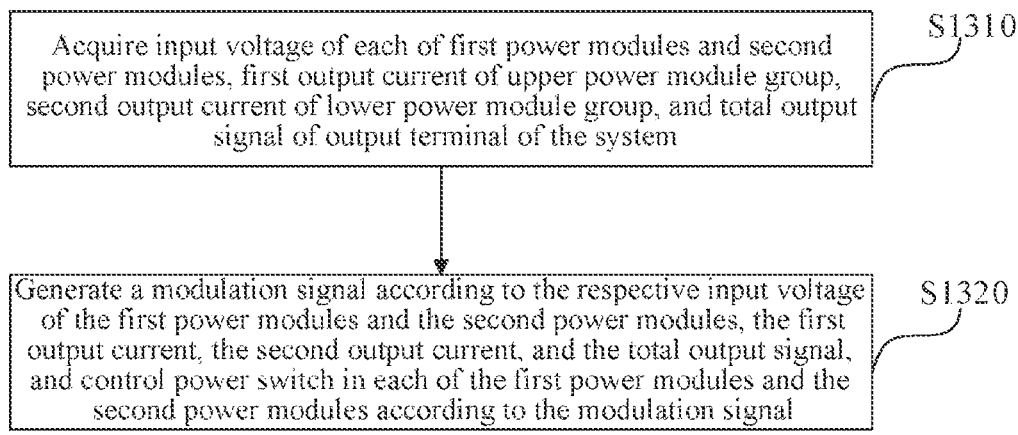
FIG. 14 schematically shows a flowchart of a control method of a DC conversion system according to an embodiment of the present disclosure.

As shown in FIG. 14, an embodiment of the present disclosure provides a control method for a DC conversion system. The DC conversion system includes at least two first power modules, at least two second power modules, and a controller. The input terminals of the at least two first power modules are connected in series and the output terminals are connected in parallel to form an upper power module group. The input terminals of the at least two second power modules are connected in series and output terminals are connected in parallel to form a lower power module group. The controller is respectively connected to each of the first power modules and the second power modules. The control method includes the following steps.

At step S1310, acquiring respective input voltages of the first power modules and the second power modules, a first output current of the upper power module group, a second output current of the lower power module group, and a total output signal of the output terminal of the conversion system.

At step S1320, generating a modulation signal according to the respective input voltage of the first power modules and the second power modules, the first output current, the second output current, and the total output signal, and controlling power switch in each of the first power modules and the second power modules according to the modulation signal.

The total output signal can be one, two or three of the following signals: a total output voltage, a total output current, and a total output power.

Figure 15:
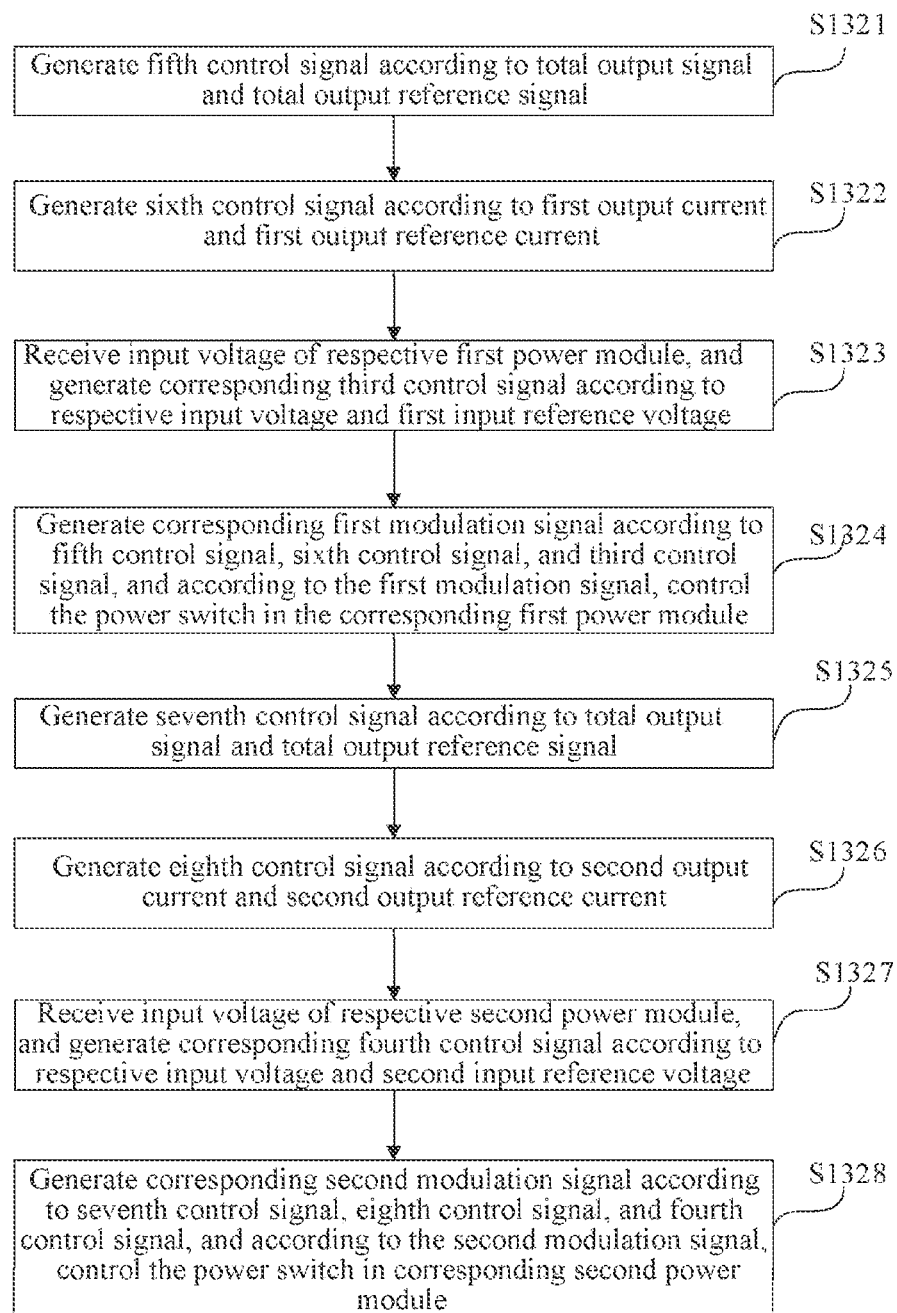
FIG. 15 schematically shows a flowchart of a step of generating a modulated signal according to an embodiment of the present disclosure.

For example, as shown in FIG. 15, in step S1320, the step of generating the modulation signal includes the following steps.

At step S1321, generating a fifth control signal according to the total output signal and a total output reference signal.

At step S1322, generating a sixth control signal according to the first output current and a first output reference current.

At step S1323, receiving the input voltage of the respective first power module, and generating a corresponding third control signal according to the input voltage and a first input reference voltage.

At step S1324, generating a corresponding first modulation signal according to the fifth control signal, the sixth control signal and the third control signal, and controlling a power switch in the corresponding first power module according to the first modulation signal.

At step S1325, generating a seventh control signal according to the total output signal and the total output reference signal.

At step S1326, generating an eighth control signal according to the second output current and the second output reference current.

At step S1327, receiving the input voltage of the respective second power module, and generating a corresponding fourth control signal according to the input voltage and a second input reference voltage.

At step S1328, generating a corresponding second modulation signal according to the seventh control signal, the eighth control signal, and the fourth control signal, and controlling a power switch in the corresponding second power module according to the second modulation signal.

In the embodiment, the fifth control signal and the seventh control signal may be the same signal, or may be different signals.

According to the type of the total output signal, different control strategies can be adopted, that is, the processes of generating the fifth control signal, the sixth control signal, the seventh control signal, and the eighth control signal in step S1321, step S1322 and step S1325 and step S1326 are different. The details are as follows.

When the total output signal is a total output voltage, step S1321 may include: generating a fifth control signal according to the total output voltage and a total output reference voltage; step S1322 may include: obtaining a first output power according to the total output voltage and the first output current; and generating a sixth control signal according to the first output power and a first output reference power; step S1325 may include: generating a seventh control signal according to the total output voltage and a total output reference voltage; step S1326 may include: obtaining a second output power according to the total output voltage and the second output current; and generating an eighth control signal according to the second output power and a second output reference power.

When the total output signal includes a total output voltage and a total output current, step S1321 may include: generating a fifth control signal according to the total output current and a total output reference current; step S1322 may include: obtaining a first output power according to the total output voltage and the first output current; and generating a sixth control signal according to the first output power and the first output reference power; step S1325 may include: generating a seventh control signal according to the total output current and the total output reference current; step S1326 may include: obtaining a second output power according to the total output voltage and the second output current; and generating an eighth control signal according to the second output power and a second output reference power.

When the total output signal includes a total output voltage and a total output power, step S1321 may include: generating a fifth control signal according to the total output power and a total output reference power; step S1322 may include: obtaining a first output power according to the total output voltage and the first output current; and generating a sixth control signal according to the first output power and a first output reference power; step S1325 may include: generating a seventh control signal according to the total output power and the total output reference power; step S1326 may include: obtaining a second output power according to the total output voltage and the second output current; and generating an eighth control signal according to the second output power and the second output reference power.

When the total output signal is a total output voltage, step S1321 may include: obtaining a total output power according to the total output voltage, the first output current, and the second output current; and generating a fifth control signal according to the total output power and the total output reference power; step S1322 may include: obtaining a first output power according to the total output voltage and the first output current; and generating a sixth control signal according to the first output power and a first output reference power; step S1325 may include: generating a seventh control signal according to the total output power obtained in step S1321 and the total output reference power; step S1326 may include: obtaining a second output power according to the total output voltage and the second output current; and generating an eighth control signal according to the second output power and the second output reference power.

Similarly, in the above steps, the first input reference voltage and the second input reference voltage may be equal or not equal.

When a difference between the corresponding input voltage and the input reference voltage is greater than a first threshold or less than a second threshold, the third control signal or the fourth control signal is adjusted by a voltage equalization control unit; when the difference is not greater than (i.e. less than or equal to) the first threshold and not less than (i.e. greater than or equal to) the second threshold, the voltage equalization control unit maintains the corresponding third control signal or fourth control signal. Herein, the first threshold is greater than or equal to the second threshold.

The embodiment of the present disclosure solves the problem of unbalanced series voltage on the high-voltage side of the DC conversion system by using a control algorithm, which does not need to add a hardware voltage equalization circuit, and therefore has a low cost. In addition, by using the output power control of the upper and lower buses and the input voltage control, the following advantages are realized, in the case that the series neutral point of the ISOP DC conversion system is connected to the ground or connected to the voltage midpoint, it is ensured that the input voltages of the power modules connected in series are equalized and the output power of the upper and lower buses are distributed according to the reference. In addition, the number of power modules of the DC conversion system in the embodiment of the present disclosure can be flexibly changed based on the application condition, therefore having strong scalability.

In addition, in the embodiment of the present disclosure, the series neutral point of the high-voltage side of the ISOP DC conversion system is connected to the ground or connected to the neutral point of the DC bus, which can reduce the voltage-to-ground of each power module and also provide more flexible load-carrying capacity and improved system reliability.

In the DC conversion system and the control method thereof according to the embodiments of the present disclosure, the input terminals of the upper power module group and the lower power module group are connected in series and the output terminals the upper power module group and the lower power module group are connected in parallel. The controller controls the internal power switch of each of power modules to operate, based on the input voltage of the input terminal of each of power modules, and the output currents of the output terminals of the upper and lower power module groups, which can realize the voltage balance control of the respective input voltages of the power modules and the current balance control of the output currents.

After considering the specification and practicing the invention disclosed herein, those skilled in the art will easily think of other embodiments of the present disclosure. This application is intended to cover any variations, uses, or adaptive changes of the present disclosure. These variations, uses, or adaptive changes follow the general principles of the present disclosure and include common knowledge or conventional technical means in the technical field not disclosed by the present disclosure. The description and the embodiments are regarded as exemplary only, and the true scope and spirit of the present disclosure are pointed out by the following claims.

It should be understood that the present disclosure is not limited to the precise structure described above and shown in the drawings, and various modifications and changes can be made without departing from its scope. The scope of the present disclosure is only limited by the appended claims.

What is claimed is:

1. A DC conversion system, comprising:
an input terminal and an output terminal;
an upper power module group comprising an input terminal, an output terminal, and at least two first power modules, the input terminals of the at least two first power modules being connected in series, and the output terminals of the at least two first power modules being connected in parallel;
a lower power module group comprising an input terminal, an output terminal, and at least two second power modules, the input terminals of the at least two second power modules being connected in series, and the output terminals of the at least two second power modules being connected in parallel;
the input terminal of the upper power module group and the input terminal of the lower power module group being connected in series, and the output terminal of the upper power module group and the output terminal of the lower power module group being connected in parallel;
a controller coupled to the upper power module group and the lower power module group, and configured to:
receive an input voltage of respective input terminal of each of the first power modules and the second power modules, a current of the output terminal of the upper power module group defining a first output current, a current of the output terminal of the lower power module group defining a second output current, and a total output signal of the output terminal of the DC conversion system, and generate a modulation signal according to the input voltage of respective input terminal of each of the first power modules and the second power modules, the first output current, the second output current, and the total output signal, so as to control a power switch of each of the first power modules and the second power modules, wherein the controller comprises a main controller and a plurality of local controllers, the main controller being coupled with the plurality of local controllers, and the main controller is configured to: generate a first control signal according to the first output current and the total output signal; and generate a second control signal according to the second output current and the total output signal;

each of the plurality of local controllers being coupled to a corresponding one of the first power modules and the second power modules, wherein, each of the plurality of local controllers coupled to the first power modules is configured to:

receive the first control signal;

receive the input voltage of the respective first power module, and generate a corresponding third control signal according to the input voltage of the respective first power module and a first input reference voltage; and generate a corresponding first modulation signal according to the first control signal and the third control signal, so as to control the power switch of the respective first power module;

wherein, each of the plurality of local controllers coupled to the second power modules is configured to:

receive the second control signal;

receive the input voltage of the respective second power module, and generate a corresponding fourth control signal according to the input voltage of the respective second power module and a second input reference voltage; and generate a corresponding second modulation signal according to the second control signal and the fourth control signal, so as to control the power switch of the respective second power module.

2. The DC conversion system according to claim 1, wherein series-connected node of the input terminal of the upper power module group and the input terminal of the lower power module group is grounded or connected with a voltage neutral point of the input terminal of the DC conversion system.

3. The DC conversion system according to claim 1, wherein the number of the first power modules is different from the number of the second power modules.

4. The DC conversion system according to claim 1, wherein the total output signal comprises at least one of the following: a total output voltage, a total output current and a total output power.

5. The DC conversion system according to claim 1, wherein the main controller is configured to:

generate a fifth control signal according to the total output signal and a total output reference signal;

generate a sixth control signal according to the first output current and a first output reference current; and generate the first control signal according to the fifth control signal and the sixth control signal;

generate a seventh control signal according to the total output signal and the total output reference signal;

generate an eighth control signal according to the second output current and a second output reference current; and generate the second control signal according to the seventh control signal and the eighth control signal.

6. The DC conversion system according to claim 1, wherein the total output signal is a total output voltage; the main controller is configured to:

generate a fifth control signal according to the total output voltage and a total output reference voltage;

obtain a first output power according to the total output voltage and the first output current, and generate a sixth control signal according to the first output power and a first output reference power;

generate the first control signal according to the fifth control signal and the sixth control signal;

generate a seventh control signal according to the total output voltage and the total output reference voltage;

obtain a second output power according to the total output voltage and the second output current, and generate an eighth control signal according to the second output power and a second output reference power;

generate the second control signal according to the seventh control signal and the eighth control signal.

7. The DC conversion system according to claim 1, wherein the total output signal comprises a total output voltage and a total output current;

the main controller is configured to:

generate a fifth control signal according to the total output current and a total output reference current;

obtain a first output power according to the total output voltage and the first output current, and generate a sixth control signal according to the first output power and a first output reference power;

generate the first control signal according to the fifth control signal and the sixth control signal;

generate a seventh control signal according to the total output current and the total output reference current;

obtain a second output power according to the total output voltage and the second output current, and generate an eighth control signal according to the second output power and a second output reference power;

generate the second control signal according to the seventh control signal and the eighth control signal.

8. The DC conversion system according to claim 1, wherein the total output signal comprises a total output voltage and a total output power;

the main controller is configured to:

generate a fifth control signal according to the total output power and a total output reference power;

obtain a first output power according to the total output voltage and the first output current, and generate a sixth control signal according to the first output power and a first output reference power;

generate the first control signal according to the fifth control signal and the sixth control signal;

generate a seventh control signal according to the total output power and the total output reference power;

obtain a second output power according to the total output voltage and the second output current, and generate an eighth control signal according to the second output power and a second output reference power;

generate the second control signal according to the seventh control signal and the eighth control signal.

9. The DC conversion system according to claim 1, wherein the total output signal comprises a total output voltage;
the main controller is configured to:
obtain a total output power according to the total output voltage, the first output current and the second output current, and generate a fifth control signal according to the total output power and a total output reference power;
obtain a first output power according to the total output voltage and the first output current, and generate a sixth control signal according to the first output power and a first output reference power;
generate the first control signal according to the fifth control signal and the sixth control signal;
generate a seventh control signal according to the total output power and the total output reference power;
obtain a second output power according to the total output voltage and the second output current, and generate an eighth control signal according to the second output power and the second output reference power;
generate the second control signal according to the seventh control signal and the eighth control signal.

10. A DC conversion system, comprising:
an input terminal and an output terminal;
an upper power module group comprising an input terminal, an output terminal, and at least two first power modules, the input terminals of the at least two first power modules being connected in series, and the output terminals of the at least two first power modules being connected in parallel;
a lower power module group comprising an input terminal, an output terminal, and at least two second power modules, the input terminals of the at least two second power modules being connected in series, and the output terminals of the at least two second power modules being connected in parallel;
the input terminal of the upper power module group and the input terminal of the lower power module group being connected in series, and the output terminal of the upper power module group and the output terminal of the lower power module group being connected in parallel;
a controller coupled to the upper power module group and the lower power module group, and the controller is configured to:
receive an input voltage of respective input terminal of each of the first power modules and the second power modules;
a current of the output terminal of the upper power module group defining a first output current, a current of the output terminal of the lower power module group defining a second output current, a current of the output terminal of the DC conversion system defining a total output current, receive at least two of the first output current, the second output current, and the total output current; and
generate a modulation signal according to at least two of the first output current, the second output current, and the total output current, as well as the input voltage of each of the first power modules and the second power modules, so as to control a power switch of each of the first power modules and the second power modules,
wherein the controller comprises a main controller and a plurality of local controllers,
the main controller being coupled with the plurality of local controllers, and the main controller is configured to: generate a ninth control signal according to the first output current and a first output reference current and generate a tenth control signal according to the second output current and a second output reference current;
each of the plurality of local controllers being coupled to a corresponding one of the first power modules and the second power modules, wherein, each of the plurality of local controllers coupled to the first power modules is configured to:
receive the ninth control signal;
receive the respective input voltage, and generate a corresponding third control signal according to the respective input voltage and a first input reference voltage; and
generate a corresponding first modulation signal according to the ninth control signal and the third control signal, so as to control the power switch of the respective first power module;
wherein, each of the plurality of local controllers coupled to the second power modules is configured to:
receive the tenth control signal;
receive the respective input voltage and generate a corresponding fourth control signal according to the respective input voltage and a second input reference voltage; and
generate a corresponding second modulation signal according to the tenth control signal and the fourth control signal, so as to control the power switch of the respective second power module.

11. The DC conversion system according to claim 10, wherein the series-connected node of the input terminal of the upper power module group and the input terminal of the lower power module group is grounded or connected with a voltage neutral point of the input terminal of the DC conversion system.

12. A control method for a DC conversion system, wherein the DC conversion system comprises at least two first power modules, at least two second power modules, and a controller, and input terminals of the at least two first power modules being connected in series to form an upper power module group, input terminals of the at least two second power modules being connected in series to form a lower power module group, and output terminals of each of the first power modules and each of the second power modules being connected in parallel, the controller being coupled to each of the first power modules and the second power modules, and the control method comprising:
acquiring a respective input voltage of each of the first power modules and the second power modules;
acquiring a first output current of the upper power module group, a second output current of the lower power module group, and a total output signal of the output terminal of the DC conversion system;
generating a modulation signal according to the input voltage of each of the first power modules and the second power modules, the first output current, the second output current, and the total output signal;
according to the modulation signal, controlling a power switch of each of the first power modules and the second power modules,
wherein the step of generating the modulation signal according to the input voltage, the first output current, the second output current, and the total output signal comprising:
generating a fifth control signal according to the total output signal and a total output reference signal;

generating a sixth control signal according to the first output current and a first output reference current;

generating a corresponding third control signal according to the respective input voltage of each of the first power modules and a first input reference voltage;

generating a corresponding first modulation signal according to the fifth control signal, the sixth control signal, and the third control signal, and according to the first modulation signal, controlling the power switch of the respective first power module; and generating a seventh control signal according to the total output signal and a total output reference signal;

generating an eighth control signal according to the second output current and a second output reference current;

generating a corresponding fourth control signal according to the respective input voltage of each of the second power modules and a second input reference voltage;

generating a corresponding second modulation signal according to the seventh control signal, the eighth control signal, and the fourth control signal, and according to the second modulation signal, controlling the power switch of the respective second power module.

* * * * *